(12) United States Patent
Matsubara et al.

(10) Patent No.: US 10,088,038 B2
(45) Date of Patent: Oct. 2, 2018

(54) POWER TRANSMISSION SYSTEM FOR VEHICLE

(71) Applicant: TOYOTA JIDOSHA KABUSHIKI KAISHA, Toyota-shi, Aichi-ken (JP)

(72) Inventors: Keigo Matsubara, Nagoya (JP); Ayumu Sagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 54 days.

(21) Appl. No.: 15/463,037

(22) Filed: Mar. 20, 2017

(65) Prior Publication Data

US 2017/0276242 A1 Sep. 28, 2017

(30) Foreign Application Priority Data

Mar. 23, 2016 (JP) ................................ 2016-059273

(51) Int. Cl.
*F16H 61/14* (2006.01)
*F16D 48/06* (2006.01)
(Continued)

(52) U.S. Cl.
CPC ......... *F16H 61/143* (2013.01); *F16D 48/066* (2013.01); *F16H 45/02* (2013.01); *F16D 13/52* (2013.01); *F16D 2500/1026* (2013.01); *F16D 2500/1045* (2013.01); *F16D 2500/10412* (2013.01); *F16D 2500/3068* (2013.01); *F16D 2500/30412* (2013.01); *F16D 2500/30421* (2013.01); *F16D 2500/3109* (2013.01); *F16D 2500/70406* (2013.01); *F16H 2045/0284* (2013.01); *F16H 2061/145* (2013.01)

(58) Field of Classification Search
CPC ....... F16H 61/14; F16H 61/143; F16H 61/146
See application file for complete search history.

(56) References Cited

U.S. PATENT DOCUMENTS 5,056,380 A * 10/1991 Sawasaki .............. F16H 61/143
477/38
5,609,551 A 3/1997 Sakai
(Continued)

FOREIGN PATENT DOCUMENTS

JP H08-159270 A 6/1996
JP 2009014189 A 1/2009

OTHER PUBLICATIONS

U.S. Appl. No. 15/457,108, filed Mar. 13, 2017 in the name of Matsubara et al.

*Primary Examiner* — Tisha D Lewis
(74) *Attorney, Agent, or Firm* — Oliff PLC

(57) ABSTRACT

If the difference between output torque output from an engine and load torque from drive wheels is large and torque input to a lockup clutch is large, since a value of lockup command pressure at which lockup engagement pressure in lockup end control becomes constant standby pressure is set to be high, fast release of the lockup clutch or racing of the engine is suppressed during the lockup end control. If torque input to the lockup clutch is small, the value of the lockup command pressure at which the lockup engagement pressure in the lockup end control becomes the constant standby pressure is set to be low, and a hydraulic pressure output period during which hydraulic pressure is output to the lockup clutch is set to be short.

5 Claims, 11 Drawing Sheets

(51) Int. Cl.
*F16H 45/02* (2006.01)
*F16D 13/52* (2006.01)

(56) References Cited

U.S. PATENT DOCUMENTS

| | | | |
|---|---|---|---|
| 8,886,435 B2 * | 11/2014 | Nagami | F16H 61/143 |
| | | | 180/292 |
| 2010/0145584 A1 | 6/2010 | Kojima | |

* cited by examiner

FIG. 4

| | ENGAGEMENT OPERATION TABLE | | | | | |
|---|---|---|---|---|---|---|
| | C1 | C2 | C3 | C4 | Br1 | Br2 |
| 1st | O | | | | | O |
| 2nd | O | | | | O | |
| 3rd | O | | O | | | |
| 4th | O | | | O | | |
| 5th | O | O | | | | |
| 6th | | O | | O | | |
| 7th | | O | O | | | |
| 8th | | O | | | O | |
| Rev | | | O | | | O |

POWER TRANSMISSION SYSTEM FOR VEHICLE

CROSS-REFERENCE TO RELATED APPLICATIONS

This application claims priority to Japanese Patent Application No. 2016-059273 filed on Mar. 23, 2016, the entire contents of which are hereby incorporated by reference.

BACKGROUND

1. Technical Field

The present disclosure relates to a control technique for suppressing shock during lockup end control in a power transmission system for a vehicle which executes the lockup end control for decreasing control hydraulic pressure to release a lockup clutch.

2. Description of Related Art

Of power transmission systems for a vehicle provided with a transmission, a torque converter (or fluid coupling), and a lockup clutch, a power transmission system for a vehicle which executes lockup end control for decreasing control hydraulic pressure to release the lockup clutch is known. The torque converter (or fluid coupling) is provided between the transmission and a power source. The lockup clutch directly connects an input member and an output member of the torque converter (or fluid coupling) with supply of control hydraulic pressure to a control oil chamber. For example, a power transmission system for a vehicle described in Japanese Patent Application Publication No. 2009-14189 (JP 2009-14189 A) is known. In the power transmission system for a vehicle of JP 2009-14189 A, in the lockup end control (lockup clutch release control), command pressure at the time of the start of lockup end control to be executed next time is corrected by learning based on the difference between an actual time and a target time from when the lockup end control is commanded until the release of the lockup clutch is actually started.

SUMMARY

On the other hand, in JP 2009-14189 A, in the power transmission system for a vehicle, a lockup region is comparatively narrow and a situation in which the lockup clutch is released, that is, a situation in which the execution of the lockup end control starts is comparatively limited. For this reason, it is possible to control the lockup end control with satisfactory accuracy only by correcting the command pressure at the time of the start of the lockup end control to be executed next time based on learning. However, for example, in a case where the lockup region is expanded to a slip type and the lockup end control is executed from various slip situations, if the lockup end control is executed with the command pressure after learning evenly, retaining torque or required time until the lockup clutch is completely released does not become appropriate, and a problem in that unexpected shock occurs or the lockup end control time is unnecessarily extended is considered. In particular, in a torque converter of a type in which a front oil chamber and a rear oil chamber are the same chamber, such a problem is likely to occur.

In consideration of the above situation, the present disclosure provides a power transmission system for a vehicle which suppresses the occurrence of shock during lockup end control compared to the related art and reduces the time of the lockup end control.

Accordingly, according to an aspect of the present disclosure, there is provided a power transmission system for a vehicle including a transmission, a torque converter, a lockup clutch, and an electronic control unit. The torque converter is provided between the transmission and a power source. The lockup clutch is configured to directly connect an input member and an output member of the torque converter with supply of control hydraulic pressure to a control oil chamber. The electronic control unit is configured to: (i) execute lockup end control that decreases the control hydraulic pressure to release the lockup clutch, and (ii) make end control initial hydraulic pressure of the lockup end control higher as a difference between output torque output and driven torque is larger, when the electronic control unit determines that the execution of the lockup end control starts, the output torque being from the power source when the electronic control unit determines that the execution of the lockup end control starts, the driven torque being supplied from the drive wheels.

According to the power transmission system for a vehicle described above, in a case where it is determined that the lockup end control starts, the end control initial hydraulic pressure of the lockup end control is made higher when the difference between the output torque output from the power source when it is determined that the execution of the lockup end control starts and the driven torque from the drive wheels is larger. For this reason, if the difference between the output torque output from the power source when it is determined that the execution of the lockup end control starts and the driven torque from the drive wheels is large and torque input to the lockup clutch is large, the end control initial hydraulic pressure of the lockup end control becomes high, whereby fast release of the lockup clutch or racing of the rotation speed of the power source is suppressed during the lockup end control and shock during the lockup end control is suppressed. If the difference between the output torque output from the power source when it is determined that the execution of the lockup end control starts and the driven torque from the drive wheels is small and the torque input to the lockup clutch is small, the end control initial hydraulic pressure of the lockup end control becomes low and the hydraulic pressure output period during which hydraulic pressure is output to the lockup clutch is set to be shortened, whereby it is possible to reduce the time of the lockup end control.

In the power transmission system for a vehicle, the electronic control unit may be configured to make end control end hydraulic pressure of the lockup end control higher as the difference between output torque and driven torque is larger, when the electronic control unit determines that the execution of the lockup end control starts.

According to the power transmission system for a vehicle described above, in a case where it is determined that the execution of the lockup end control starts, the end control end hydraulic pressure of the lockup end control is made higher when the difference between output torque output from the power source when it is determined that the execution of the lockup end control starts and driven torque from the drive wheels is larger. For this reason, fast release of the lockup clutch or racing of the rotation speed of the power source is suppressed during the lockup end control and shock during the lockup end control is suitably suppressed. Furthermore, since the hydraulic pressure output period during which hydraulic pressure is output to the lockup clutch is suitably set to be shortened, it is possible to suitably reduce the time of the lockup end control.

In the power transmission system for a vehicle, the electronic control unit may be configured to: (i) make the end control end hydraulic pressure equal to or greater than first hydraulic pressure required for packing a pack clearance of the lockup clutch, when the vehicle is accelerating when the execution of the lockup end control starts, and (ii) make the end control end hydraulic pressure have a value less than the first hydraulic pressure, when the vehicle is accelerating when the execution of the lockup end control starts.

According to the power transmission system for a vehicle described above, since, in a case where the vehicle is accelerating when the execution of the lockup end control starts, make the end control end hydraulic pressure equal to or greater than first hydraulic pressure required for packing a pack clearance of the lockup clutch, and in a case where the vehicle is decelerating when the execution of the lockup end control starts, make the end control end hydraulic pressure have a value less than the first hydraulic pressure, shock when releasing the lockup clutch from a state where the vehicle is accelerating or the vehicle is decelerating is suitably suppressed.

In the power transmission system for a vehicle, the electronic control unit may be configured to make a sweeping rate when the electronic control unit estimates that an increase rate of an engine rotation speed larger than the sweeping rate when the electronic control unit does not estimate that an increase rate of a rotation speed of the power source becomes large, the sweeping rate being values until the end control end hydraulic pressure is reached from the end control initial hydraulic pressure, when the execution of the lockup end control starts.

According to the power transmission system for a vehicle described above, in a case where it is estimated that an increase rate of a rotation speed of the power source becomes large when the execution of the lockup end control starts, a sweeping rate until the end control end hydraulic pressure is reached from the end control initial hydraulic pressure is made larger than a case where it is not estimated that an increase rate of a rotation speed of the power source becomes large. For this reason, in a case where it is not estimated that the increase rate of the rotation speed of the power source becomes large, since the sweeping rate becomes comparatively small, a slip period of the lockup clutch during the lockup end control is extended and a shock suppression effect during the lockup end control becomes high.

In the power transmission system for a vehicle, the lockup end control may have constant standby control, end control, and sweep control. The electronic control unit may be configured to: (i) make the control hydraulic pressure stand by at the end control initial hydraulic pressure for a predetermined time, in the constant standby control, (ii) decrease, at a sweeping rate, the control hydraulic pressure until the end control end hydraulic pressure is reached from the end control initial hydraulic pressure, in the sweep control, (iii) in the end control, end the lockup end control by setting the control hydraulic pressure to zero when the control hydraulic pressure becomes the end control end hydraulic pressure, in the end control, and (iv) execute control in an order of the constant standby control, the sweep control, and the end control, in the lockup end control.

According to the power transmission system for a vehicle described above, the lockup end control has the constant standby control for making the control hydraulic pressure stand by at the end control initial hydraulic pressure for the predetermined time, the end control for ending the lockup end control by setting the control hydraulic pressure to zero if the control hydraulic pressure becomes the end control end hydraulic pressure, and the sweep control for decreasing, at a sweeping rate, the control hydraulic pressure until the end control end hydraulic pressure is reached from the end control initial hydraulic pressure, and the lockup end control is executed in an order of the constant standby control, the sweep control, and the end control. For this reason, the control hydraulic pressure is suitably decreased by the lockup end control to the release the lockup clutch.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 4 is an engagement operation table illustrating the relationship between gear shift operation of the automatic transmission of FIG. 2 and a combination of operation of hydraulic frictional engagement devices used therein;

DETAILED DESCRIPTION OF EMBODIMENTS

Figure 1:
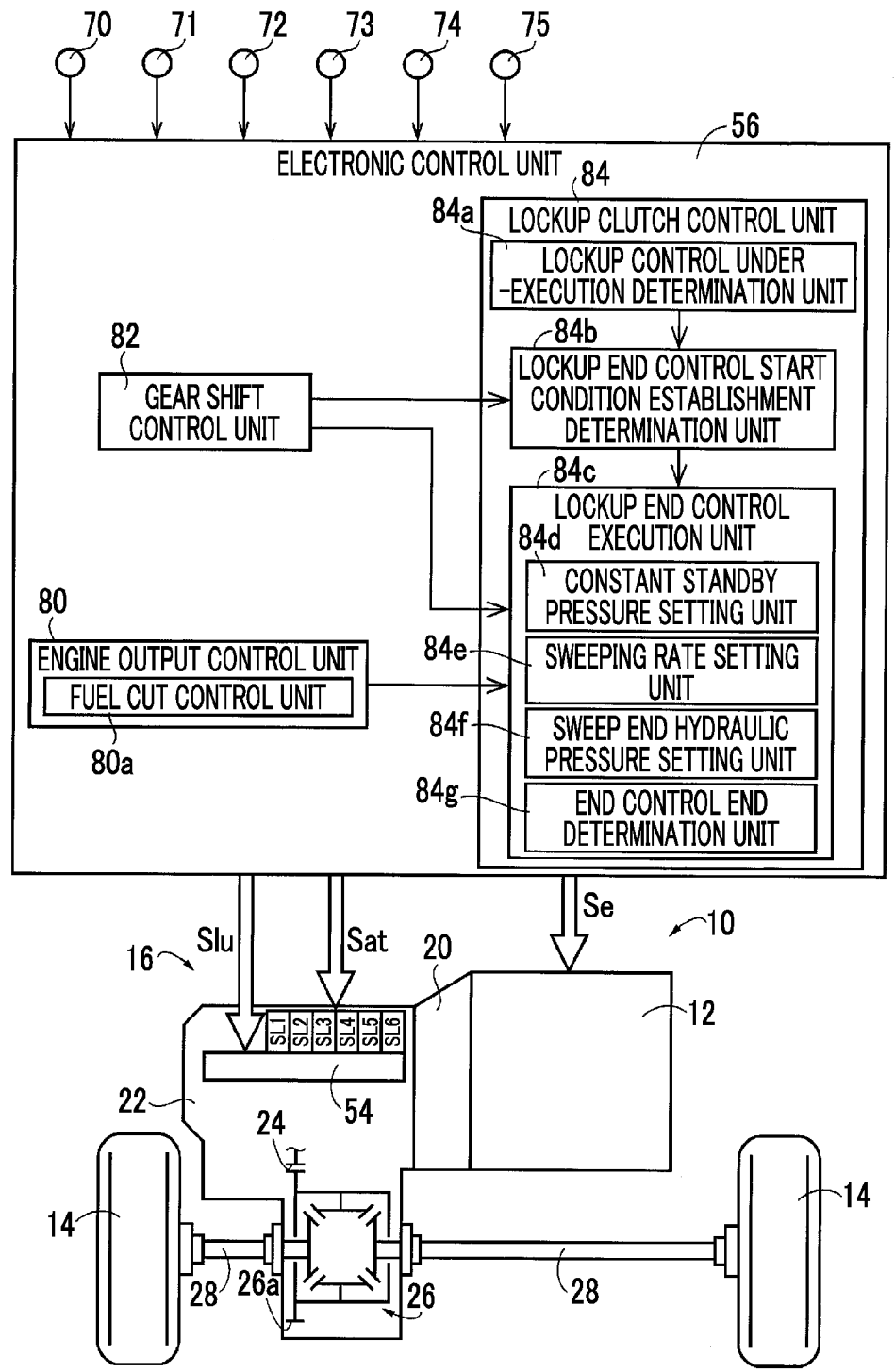
FIG. 1 is a diagram illustrating the schematic configuration of a vehicle to which a power transmission system for a vehicle of a first embodiment as an example of the present disclosure is applied, and illustrating a control function for various kinds of control in the vehicle.

Hereinafter, an embodiment of the present disclosure will be described in detail referring to the drawings. In the following embodiment, the drawings are suitably simplified or deformed, and portions are not necessarily precisely depicted in terms of dimension ratio, shape, and the like.

FIG. 1 is a diagram illustrating the schematic configuration of a vehicle 10 to which the present disclosure is applied, and is a diagram illustrating a main part of a control system for various kinds of control in the vehicle 10. In FIG. 1, the vehicle 10 is provided with a power source (hereinafter, referred to as an engine) 12, drive wheels 14, and a power transmission system 16 for a vehicle (hereinafter, referred to as a power transmission system 16) provided in a power transmission path between the engine 12 and the drive wheels 14. The power transmission system 16 is provided with a torque converter 20 and an automatic transmission (transmission) 22, a differential gear device (differential gear set) 26, and a pair of axles 28, and the like. A torque converter generally indicates a device having a torque amplification effect to increase and output input torque, and a fluid coupling which is a device having no torque amplification effect and outputting input torque without increasing input torque is also included and handled as a torque converter. Accordingly, all devices described below are referred to as the torque converter 20. The torque converter 20 and the automatic transmission 22 are provided inside a case 18 (see FIG. 2) as a non-rotating member attached to a vehicle body. The differential gear device 26 has a ring gear 26a to which a transmission output gear 24 as an output rotating member of the automatic transmission 22 is coupled. A pair of axles 28 are coupled to the differential gear device 26. In the power transmission system 16, power output from the engine 12 is transmitted to the drive wheels 14 sequentially through the torque converter 20, the automatic transmission 22, the differential gear device 26, the axles 28, and the like. The torque converter 20 is provided in a power transmission path between the automatic transmission 22 and the engine 12.

The engine 12 is a power source of the vehicle 10, and is, for example, an internal combustion engine, such as a gasoline engine or a diesel engine.

Figure 2:
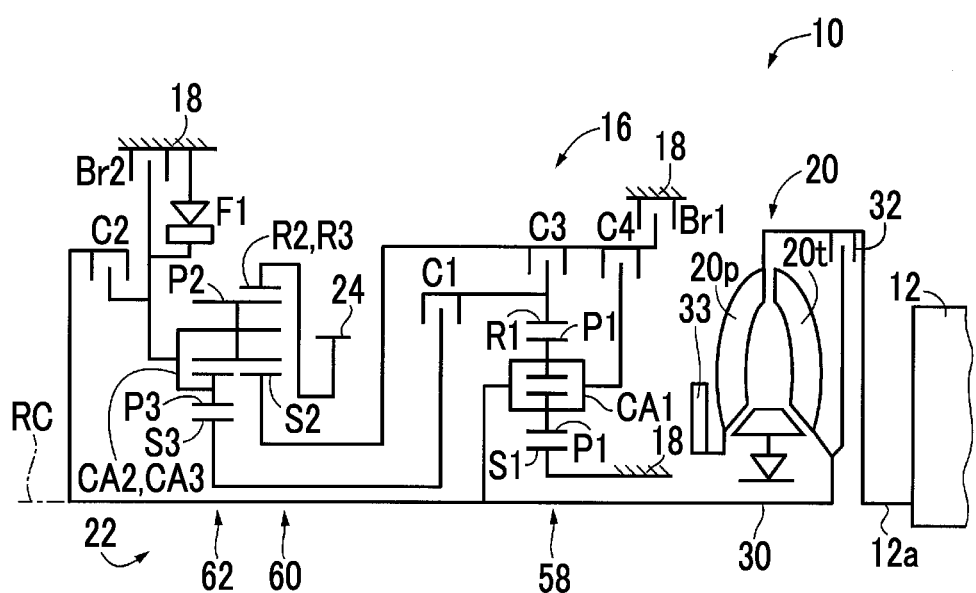
FIG. 2 is a schematic view illustrating an example of a torque converter or an automatic transmission provided in the vehicle of FIG. 1.

FIG. 2 is a schematic view illustrating an example of the torque converter 20 or the automatic transmission 22. The torque converter 20, the automatic transmission 22, or the like is constituted nearly symmetrically with respect to an axis RC of a transmission input shaft 30 as an input rotating member of the automatic transmission 22. In FIG. 2, a lower half portion of an axis RC of the torque converter 20, the automatic transmission 22, or the like is not shown.

Figure 3:
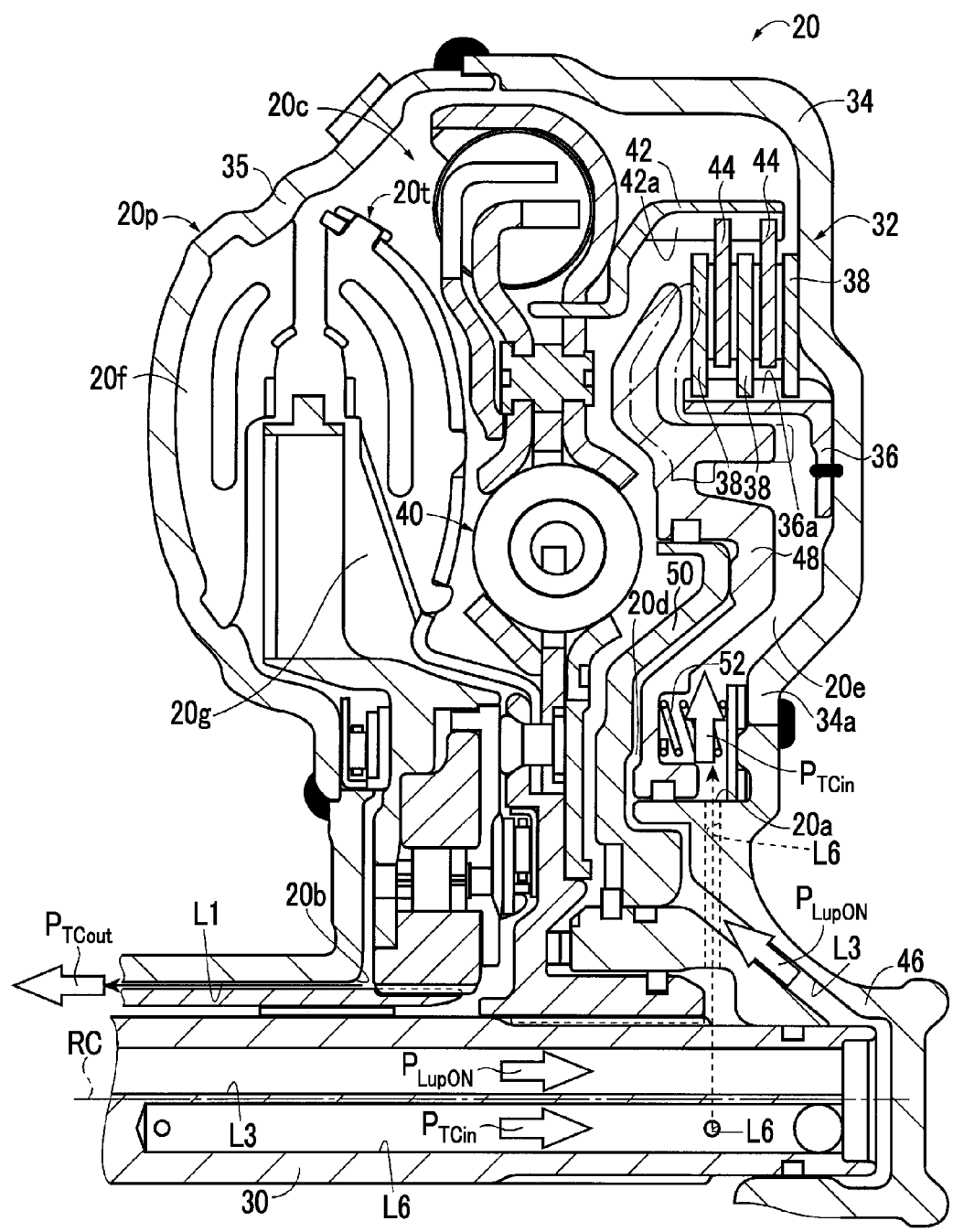
FIG. 3 is a sectional view of the torque converter of FIG. 2.

As shown in FIGS. 2 and 3, the torque converter 20 is coupled to a crank shaft 12a of the engine 12 such that power transmission is possible. The torque converter 20 is provided with a front cover 34 and a rear cover 35, a plurality of pump blades 20f, a pump impeller (input member) 20p, and a turbine impeller (turbine runner) (output member) 20t. The front cover 34 and the rear cover 35 are welded to each other. A plurality of pump blades 20f are fixed inside the rear cover 35. The pump impeller 20p is provided to rotate around the axis RC. The turbine impeller 20t faces the rear cover 35 and is coupled to the transmission input shaft 30 such that power transmission is possible. The torque converter 20 is provided with a lockup clutch 32 inside a control oil chamber 20d described below. The lockup clutch 32 directly connects the pump impeller 20p and the turbine impeller 20t with supply of lockup engagement pressure (control hydraulic pressure) $P_{SLU}$. In this way, the torque converter 20 functions as a fluid type transmission device for a vehicle with the lockup clutch 32 provided in the power transmission path between the engine 12 and the automatic transmission 22. The power transmission system 16 is provided with a mechanical oil pump 33 which is coupled to the pump impeller 20p such that power transmission is possible. The oil pump 33 is rotationally driven by the engine 12 and generates (ejects) hydraulic pressure for performing gear shift control of the automatic transmission 22, engaging the lockup clutch 32, or supplying lubricating oil to the respective units of the power transmission path of the power transmission system 16.

The lockup clutch 32 is a hydraulic multiple disc friction clutch. As shown in FIG. 3, the lockup clutch 32 is provided with a first annular member 36, a plurality (in this embodiment, three) of annular first friction plates (friction plates) 38, a second annular member 42, a plurality (in this embodiment, two) of annular second friction plates (friction plates) 44, an annular pressing member (piston) 48, an annular fixed member 50, and a return spring 52. The first annular member 36 is fixed to the front cover 34 integrally coupled to the pump impeller 20p through welding. The first friction plates 38 are engaged with outer circumferential spline teeth 36a formed on the outer circumference of the first annular member 36 to be relatively unrotatable around the axis RC and movable in the direction of the axis RC. The second annular member 42 is coupled to the transmission input shaft 30 and the turbine impeller 20t through a damper device 40 provided inside the torque converter 20 such that power transmission is possible. The second friction plates 44 are engaged with inner circumferential spline teeth 42a formed on the inner circumference of the second annular member 42 to be relatively unrotatable around the axis RC and movable in the direction of the axis RC and are provided between a plurality of first friction plates 38. The pressing member 48 is supported by a hub member 46, which is fixed to an inner circumferential portion 34a of the front cover 34 and supports an end portion of the transmission input shaft 30 on the front cover 34 side to be rotatable around the axis RC, to be movable in the direction of the axis RC, and faces the front cover 34. The fixed member 50 is supported in a state of being positioned and fixed to the hub member 46, and is provided to face the pressing member 48 on a side of the pressing member 48 opposite to the front cover 34 side. The return spring 52 energizes the pressing member 48 toward the fixed member 50 side in the direction of the axis RC, that is, energizes the pressing member 48 in a direction of being separated from the first friction plates 38 and the second friction plates 44 in the direction of the axis RC.

As shown in FIG. 3, the torque converter 20 is provided in the front cover 34 and the rear cover 35. Then, a main oil chamber (torque converter oil chamber) 20c having a hydraulic oil supply port 20a to which hydraulic oil output from the oil pump 33 is supplied and a hydraulic oil outlet port 20b from which hydraulic oil supplied from the hydraulic oil supply port 20a flows out is formed. In the main oil chamber 20c of the torque converter 20, the lockup clutch 32, the control oil chamber 20d, a front oil chamber 20e, and a rear oil chamber 20g are provided. To the control oil chamber 20d, for example, lockup engagement pressure $P_{SLU}$ for engaging the lockup clutch 32, that is, for energizing the pressing member 48 pressing the first friction plates 38 and the second friction plates 44 of the lockup clutch 32 toward the front cover 34 side is supplied. To the front oil chamber 20e, for example, second line hydraulic pressure Psec described below for releasing the lockup clutch 32, that is, for energizing the pressing member 48 toward a side opposite to the front cover 34 side is supplied. The rear oil chamber 20g communicates with the front oil chamber 20e, is filled with hydraulic oil from the front oil chamber 20e, and allows the hydraulic oil to flow out from the hydraulic oil outlet port 20b. The control oil chamber 20d is an oil-tight space formed between the pressing member 48 and the fixed member 50, the front oil chamber 20e is a space formed between the pressing member 48 and the front cover 34, and the rear oil chamber 20g is a space excluding the control oil chamber 20d and the front oil chamber 20e in the main oil chamber 20c.

In the torque converter 20, as shown in FIG. 3, for example, if the hydraulic pressure supplied to the control oil chamber 20d, that is, lockup-on pressure $P_{LupON}$ (kPa) becomes comparatively large (the hydraulic pressure of the front oil chamber 20e, that is, torque converter-in pressure $P_{TCin}$ (kPa) is comparatively small) and the pressing member 48 is energized and moved toward the front cover 34 side as indicated by a one-dot-chain line, the first friction plates 38 and the second friction plates 44 are pressed by the pressing member 48, and the pump impeller 20p coupled to the first annular member 36 and the turbine impeller 20t coupled to the second annular member 42 rotate integrally. For example, if the lockup-on pressure $P_{LupON}$ (kPa) of the control oil chamber 20d becomes comparatively small (the torque converter-in pressure $P_{TCin}$ (kPa) of the front oil chamber 20e is comparatively large) and the pressing member 48 is moved to a position separated from the first friction plate 38 as indicated by a solid line, the pump impeller 20p coupled to the first annular member 36 and the turbine impeller 20t coupled to the second annular member 42 rotate relatively.

In the lockup clutch 32, transmission torque is controlled based on the lockup-on pressure $P_{LupON}$ (kPa) inside the control oil chamber 20d and lockup differential pressure. The lockup differential pressure $\Delta P$ is differential pressure $\Delta P$ $(=P_{LupON}-(P_{TCin}+P_{TCout})/2)$ from the average value $((P_{TCin}+P_{TCout})/2)$ of the torque converter-in pressure $P_{TCin}$ (kPa) inside the front oil chamber 20e and torque converter-out pressure $P_{TCout}$ (kPa) output from the hydraulic oil outlet port 20b. The above-described expression of the lockup differential pressure (engagement pressure) $\Delta P=P_{LupON}-(P_{TCin}+P_{TCout})/2$ is an experimental expression determined in advance by an experiment or the like. In the above-described expression, the torque converter-in pressure $P_{TCin}$ and the torque converter-out pressure $P_{TCout}$ change with an engine rotation speed Ne (rpm), a turbine rotation speed Nt (rpm), the differential rotation (engine rotation speed–turbine rotation speed) $\Delta N$ (rpm) between the engine rotation speed Ne and the turbine rotation speed Nt, second line hydraulic pressure Psec (kPa), an ATF oil temperature Toil (° C.), engine torque Te (Nm), or the like. The torque converter-out pressure $P_{TCout}$ changes with change in centrifugal hydraulic pressure inside the rear oil chamber 20g of the torque converter 20 due to change in the engine rotation speed Ne, the turbine rotation speed Nt, the ATF oil temperature Toil, or the like.

The lockup differential pressure $\Delta P$ is controlled by an electronic control unit (control device) 56 through a hydraulic control circuit 54, whereby the lockup clutch 32 is switched to any one operation state of, for example, a lockup release state (lockup off), a lockup slip state (slip state), and a lockup state (lockup on). The lockup release state is a state where the lockup differential pressure $\Delta P$ becomes negative and the lockup clutch 32 is released. The lockup slip state is a state where the lockup differential pressure $\Delta P$ becomes equal to or greater than zero and the lockup clutch 32 is half-engaged according to a slip. The lockup state is a state where the lockup differential pressure $\Delta P$ becomes a maximum value and the lockup clutch 32 is completely engaged. In the torque converter 20, even if the lockup clutch 32 is in the lockup state, the lockup slip state, and the lockup release state, the front oil chamber 20e and the rear oil chamber 20g are the same chamber, that is, the front oil chamber 20e and the rear oil chamber 20g constantly communicate with each other, and the lockup clutch 32 is constantly cooled by hydraulic oil flowing from the hydraulic oil supply port 20a toward the rear oil chamber 20g.

The automatic transmission 22 constitutes a part of the power transmission path from the engine 12 to the drive wheels 14, and is a planetary gear type multistage transmission which functions as a stepped automatic transmission having a plurality of gear stages (gear shift stages) with different gear ratios (gear shift ratios) formed by selectively engaging a plurality of hydraulic frictional engagement devices (first clutch C1 to fourth clutch C4, first brake Br1, second brake Br2) and a one-way clutch F1. For example, the automatic transmission is a stepped transmission which performs a clutch-to-clutch gear shift often used in a vehicle. The automatic transmission 22 has a double-pinion type first planetary gear device 58, a single-pinion type second planetary gear device 60 constituted of a Ravigneaux type, and a double-pinion type third planetary gear device 62 on the same axis (on the axis RC), and shifts the rotation of the transmission input shaft 30 and outputs the rotation from the transmission output gear 24.

The first planetary gear device 58 has a first sun gear S1 as an external gear, a first ring gear R1 as an internal gear, and a first pinion P1 constituted of a pair of gears, and a first carrier CA1. The first ring gear R1 is provided concentrically with the first sun gear S1. The first carrier CA1 supports the first pinion P1 rotatably and revolvably.

The second planetary gear device 60 has a second sun gear S2 as an external gear, a second ring gear R2 as an internal gear, a second pinion P2, and a second carrier CA2. The second ring gear R2 is provided concentrically with the second sun gear S2. The second pinion P2 meshes with the second sun gear S2 and the second ring gear R2. The second carrier CA2 supports the second pinion P2 rotatably and revolvably.

The third planetary gear device 62 has a third sun gear S3 as an external gear, a third ring gear R3 as an internal gear, a third pinion P3 constituted of a pair of gears, and a third carrier CA3. The third ring gear R3 is provided concentrically with the third sun gear S3. The third pinion P3 meshes with the third sun gear S3 and the third ring gear R3. The third carrier CA3 supports the third pinion P3 rotatably and revolvably.

Each of the first clutch C1, the second clutch C2, the third clutch C3, the fourth clutch C4, the first brake Br1, and the second brake Br2 (hereinafter, in a case where there is no need for particular distinction, simply referred to hydraulic frictional engagement devices or engagement elements) are constituted of a wet type multi-plate clutch or brake which is pressed by a hydraulic actuator, a band brake which is tightened by a hydraulic actuator, or the like.

The engagement and release of these hydraulic frictional engagement devices are controlled, whereby, as shown in the engagement operation table of FIG. 4, respective gear stages of forward eight stages and reverse one stage are formed according to a driver's accelerator operation, a vehicle speed V, or the like. In FIG. 4, "1st" to "8th" mean a first gear shift stage to an eighth gear shift stage as forward gear stages. "Rev" means a reverse gear shift stage as a reverse gear stage. A gear ratio γ (=transmission input shaft rotation speed Nin/transmission output gear rotation speed Nout) of the automatic transmission 22 corresponding to each gear shift stage is suitably determined according to the gear ratio (=the number of teeth of the sun gear/the number of teeth of the ring gear) of each of the first planetary gear device 58, the second planetary gear device 60, and the third planetary gear device 62.

Figure 5:
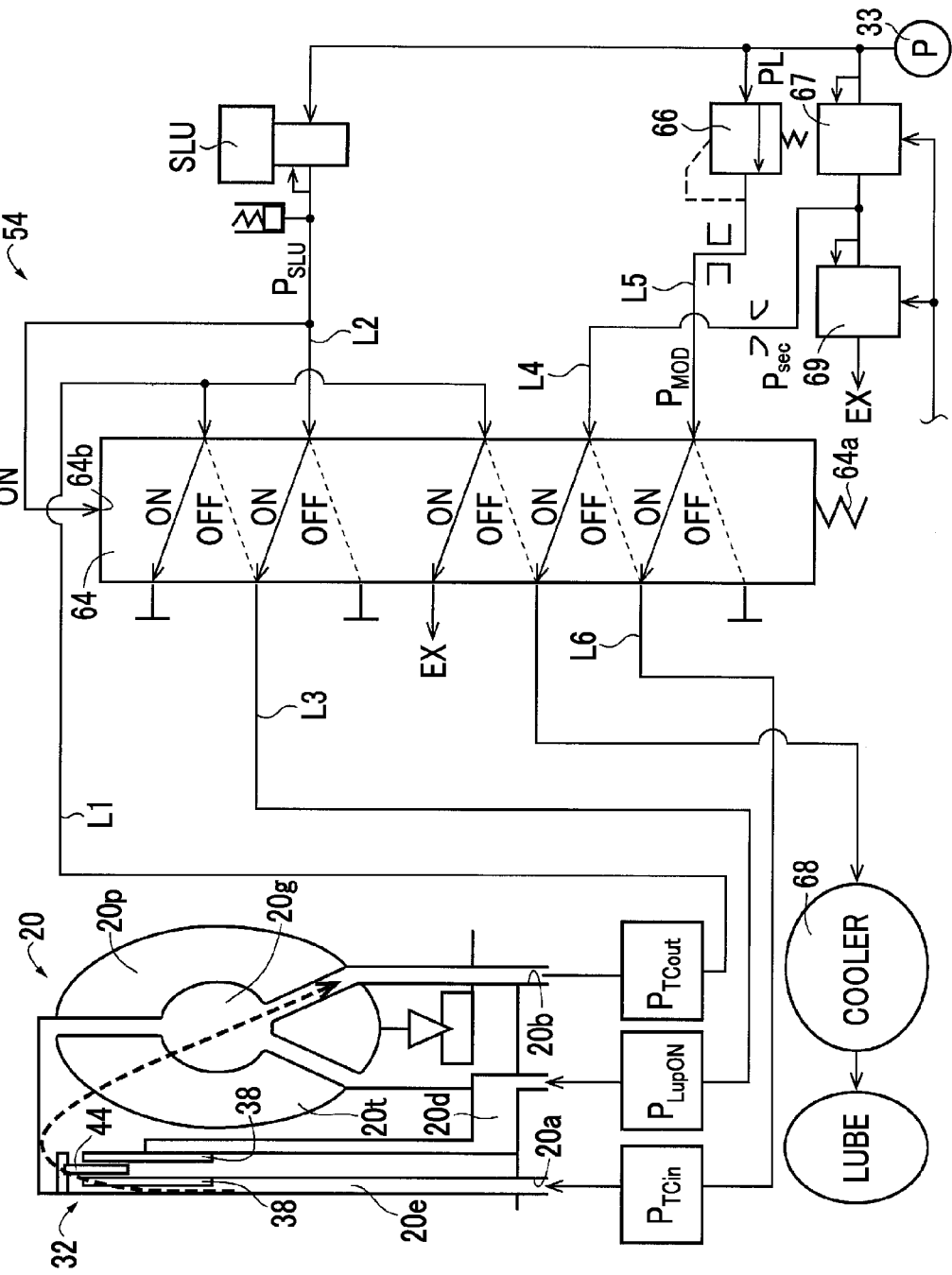
FIG. 5 is a circuit diagram showing an example of a main part of a hydraulic control circuit relating to a linear solenoid valve or the like which controls operation of a lockup clutch provided in the torque converter of FIG. 2.

As shown in FIG. 5, the hydraulic control circuit 54 is provided with a lockup control valve 64, a linear solenoid valve SLU, and a modulator valve 66. The linear solenoid valve SLU regulates first line hydraulic pressure PL regulated by a relief first line pressure regulator valve 67 to the lockup engagement pressure $P_{SLU}$ with hydraulic pressure generated from the oil pump 33 as source pressure. The modulator valve 66 regulates modulator hydraulic pressure $P_{MOD}$ to a constant value as the first line hydraulic pressure PL as source pressure. The hydraulic control circuit 54 is provided with linear solenoid valves SL1 to SL6 (see FIG. 1) which control operation of the respective hydraulic actuators (not shown) of the hydraulic frictional engagement devices. In FIG. 5, although the first line hydraulic pressure PL is used as the source pressure of the linear solenoid valve SLU, the modulator hydraulic pressure $P_{MOD}$ may be used in place of the first line hydraulic pressure PL.

As shown in FIG. 5, the lockup control valve 64 is a two-position switching valve of a type of, if the lockup engagement pressure $P_{SLU}$ exceeds a predetermined value, being switched from an OFF position to an ON position. At the ON position, the lockup control valve 64 closes a first oil passage L1, connects a second oil passage L2 to a third oil passage L3, connects the first oil passage L1 to a discharge oil passage EX, connects a fourth oil passage L4 to a cooler 68, and connects a fifth oil passage L5 to a sixth oil passage L6. The first oil passage L1 is an oil passage through which the torque converter-out pressure $P_{TCout}$ output from the hydraulic oil outlet port 20b of the torque converter 20 is guided. The second oil passage L2 is an oil passage through which the lockup engagement pressure $P_{SLU}$ regulated by the linear solenoid valve SLU is guided. The third oil passage L3 is an oil passage through which the lockup-on pressure $P_{LupON}$ supplied to the control oil chamber 20d of the torque converter 20 is guided. The fourth oil passage L4 is an oil passage through which the second line hydraulic pressure Psec regulated by the second line pressure regulator valve 69 with hydraulic pressure relieved from the first line pressure regulator valve 67 as source pressure is guided. The fifth oil passage L5 is an oil passage through which the modulator hydraulic pressure $P_{MOD}$ regulated to a constant value by the modulator valve 66 is guided. The sixth oil passage L6 is an oil passage through which the torque converter-in pressure $P_{TCin}$ supplied to the front oil chamber 20e of the torque converter 20 is guided.

As shown in FIG. 5, at the OFF position, the lockup control valve 64 connects the first oil passage L1 to the third oil passage L3, closes the second oil passage L2, connects the first oil passage L1 to the cooler 68, connects the fourth oil passage L4 to the sixth oil passage L6, and closes the fifth oil passage L5. The lockup control valve 64 is provided with a spring 64a which energizes a spool valve piece toward the OFF position side, and an oil chamber 64b which receives the lockup engagement pressure $P_{SLU}$ to energize the spool valve piece toward the ON position side. In the lockup control valve 64, in a case where the lockup engagement pressure $P_{SLU}$ is smaller than a predetermined value set to be comparatively small, the spool valve piece is maintained at the OFF position by the energizing force of the spring 64a. In the lockup control valve 64, in a case where the lockup engagement pressure $P_{SLU}$ is greater than the predetermined value, the spool valve piece is maintained at the ON position against the energizing force of the spring 64a. In the lockup control valve 64 of FIG. 5, a solid line indicates a flow passage when the spool valve piece is at the ON position, and a broken line indicates a flow passage when the spool valve piece is at the OFF position.

The hydraulic pressure supplied from the lockup control valve 64 to the control oil chamber 20d and the front oil chamber 20e in the torque converter 20 is switched by the hydraulic control circuit 54 configured as above, whereby the operation state of the lockup clutch 32 is switched. First, a case where the lockup clutch 32 is brought into the slip state and lockup on will be described. In the lockup control valve 64, if the lockup engagement pressure $P_{SLU}$ made greater than the predetermined value is supplied in response to a command signal output from the electronic control unit 56, the lockup control valve 64 is switched to the ON position. Then, the lockup engagement pressure $P_{SLU}$ is supplied to the control oil chamber 20d of the torque converter 20, and the modulator hydraulic pressure $P_{MOD}$ supplied to the lockup control valve 64 is supplied to the front oil chamber 20e of the torque converter 20. That is, the lockup engagement pressure $P_{SLU}$ is supplied to the control oil chamber 20d as the lockup-on pressure $P_{LupON}$, and the modulator hydraulic pressure $P_{MOD}$ is supplied to the front oil chamber 20e as the torque converter-in pressure $P_{TCin}$. If the lockup control valve 64 is switched to the ON position, the magnitude relationship of the lockup-on pressure $P_{LupON}$, the torque converter-in pressure $P_{TCin}$, and the torque converter-out pressure $P_{TCout}$ becomes the lockup-on pressure $P_{LupON}$>the torque converter-in pressure $P_{TCin}$>the torque converter-out pressure $P_{TCout}$. Accordingly, the lockup-on pressure (engagement pressure) $P_{LupON}$ of the control oil chamber 20d of the torque converter 20 is regulated by the linear solenoid valve SLU, whereby the lockup differential pressure $(P_{LupON}-(P_{TCin}+P_{TCout})/2)$ ΔP is regulated and the operation state of the lockup clutch 32 is switched in a range of the slip state and the lockup on (complete engagement).

Next, a case where the lockup clutch 32 is brought into lockup off will be described. In the lockup control valve 64, in a case where the lockup engagement pressure $P_{SLU}$ is smaller than the predetermined value, the lockup control valve 64 is switched to the OFF position by the energizing force of the spring 64a. Then, the torque converter-out pressure $P_{TCout}$ output from the hydraulic oil outlet port 20b of the torque converter 20 is supplied to the control oil chamber 20d of the torque converter 20, and the second line hydraulic pressure Psec is supplied to the front oil chamber 20e of the torque converter 20. That is, the torque converter-out pressure $P_{TCout}$ is supplied to the control oil chamber 20d as the lockup-on pressure $P_{LupON}$. Then, the second line hydraulic pressure Psec is supplied to the front oil chamber 20e as the torque converter-in pressure $P_{TCin}$. If the lockup control valve 64 is switched to the OFF position, the magnitude relationship of the lockup-on pressure $P_{LupON}$, the torque converter-in pressure $P_{TCin}$, and the torque converter-out pressure $P_{TCout}$ becomes the torque converter-in pressure $P_{TCin}$>the torque converter-out pressure $P_{TCout}$>the lockup-on pressure $P_{LupON}$. Accordingly, the operation state of the lockup clutch 32 is switched to lockup off.

Returning to FIG. 1, the vehicle 10 is provided with the electronic control unit 56. The electronic control unit 56 executes, for example, lockup control for controlling the lockup differential pressure ΔP of the lockup clutch 32, gear shift control for controlling the engagement pressure of the hydraulic frictional engagement devices at the time of a gear shift of the automatic transmission 22, or the like through the hydraulic control circuit 54. FIG. 1 is a diagram showing an input/output system of the electronic control unit 56, and is a functional block illustrating a main part of a control function of the electronic control unit 56. The electronic control unit 56 includes, for example, a so-called microcomputer provided with a CPU, a RAM, a ROM, an input/output interface, and the like, the CPU performs signal processing according to a program stored in advance in the ROM while using a temporarily storage function of the RAM to execute respective control of the vehicle 10.

Various input signals detected by various sensors provided in the vehicle 10 are supplied to the electronic control unit 56. For example, a signal representing a throttle valve opening θth (%) detected by a throttle valve opening sensor 70, a signal representing a vehicle speed V (km/h) detected by a vehicle speed sensor 71, a signal representing the oil temperature T (° C.) of hydraulic oil detected by an oil temperature sensor 72, a signal representing an accelerator pedal angle θacc (%) as an operation amount of an accelerator pedal detected by an accelerator operation amount sensor 73, a signal representing an engine rotation speed Ne (rpm) detected by an engine rotation speed sensor 74, a signal representing a transmission input shaft rotation speed Nin (rpm) as the rotation speed of the transmission input shaft 30 corresponding to the turbine rotation speed Nt (rpm) detected by an input shaft rotation speed sensor 75, and the like are input to the electronic control unit 56. An engine output control command signal Se for output control of the engine 12, a gear shift command pressure (command pressure) Sat for hydraulic control relating to a gear shift of the automatic transmission 22, a lockup command pressure (command pressure) Slu for switching control of the operation state of the lockup clutch 32, and the like are output from the electronic control unit 56 respectively. The gear shift command pressure Sat is a command signal for driving the linear solenoid valves SL1 to SL6 which regulate the respective hydraulic pressure supplied to the respective hydraulic actuators (not shown) of the hydraulic frictional engagement devices, and is output to the linear solenoid valves SL1 to SL6 of the hydraulic control circuit 54. The lockup command pressure Slu is a command signal for driving the linear solenoid valve SLU which regulates the lockup engagement pressure $P_{SLU}$, and is output to the linear solenoid valve SLU of the hydraulic control circuit 54.

The electronic control unit 56 shown in FIG. 1 includes, as a main part of a control function, an engine output control unit 80, a gear shift control unit 82, a lockup clutch control unit 84, and the like. The engine output control unit 80 having a fuel cut control unit 80a shown in FIG. 1 applies the actual accelerator pedal angle θacc and vehicle speed V to a relationship (for example, a drive power map) determined in advance by an experiment or in design and stored (that is, determined in advance) to calculate required drive power Fdem. The engine output control unit 80 outputs the engine output control command signal Se for performing the output control of the engine 12 to a throttle actuator, a fuel injection device, or an ignition device, or the like (not shown) in consideration of transmission loss, accessory load, the gear ratio γ of the automatic transmission 22, and the like such that the required drive power Fdem is obtained.

The fuel cut control unit 80a outputs, to the fuel injection device, the engine output control command signal Se for stopping the supply of fuel supplied from the fuel injection device if the engine rotation speed Ne becomes higher than a predetermined rotation speed (fuel cut rotation speed) determined in advance during traveling in a state of accelerator OFF where the accelerator pedal is not depressed. The fuel cut control unit 80a outputs, to the fuel injection device, the engine output control command signal Se for allowing fuel to be supplied from the fuel injection device to a degree required for idling such that the engine 12 is not stopped if the engine rotation speed Ne becomes equal to or lower than the predetermined rotation speed determined in advance during traveling in a state of accelerator OFF where the accelerator pedal is not depressed.

The gear shift control unit 82 applies the actual vehicle speed V and throttle valve opening θth to a relationship (gear shift map, gear shift diagram) determined in advance with the vehicle speed V and the throttle valve opening θth (the accelerator pedal angle θacc, the required drive power Fdem, or the like has the same meaning) as variables to determine a gear shift. For example, the gear shift command pressure Sat for engaging and/or releasing the hydraulic frictional engagement device involved in a gear shift of the automatic transmission 22 such that the determined predetermined forward gear stage is obtained according to the engagement operation table shown in FIG. 4 is output to the hydraulic control circuit 54 as a command signal. The linear solenoid valves SL1 to SL6 provided in the hydraulic control circuit 54 are driven (operated) according to the gear shift command pressure Sat such that the gear shift of the automatic transmission 22 is executed, and the hydraulic actuators of the hydraulic frictional engagement devices involved in the gear shift are operated.

As shown in FIG. 1, the lockup clutch control unit 84 is provided with a lockup control under-execution determination unit 84a, a lockup end control start condition establishment determination unit 84b, and a lockup end control execution unit 84c. The lockup clutch control unit 84 executes the lockup control for controlling the lockup differential pressure $(P_{LupON}-(P_{TCin}+P_{TCout})/2)$ ΔP of the lockup clutch 32. For example, the lockup clutch control unit 84 determines, using a relationship (lockup region diagram) determined in advance having a lockup off region, a slip operation region, and a lockup on region with the vehicle speed V and the throttle valve opening θth (the accelerator pedal angle θacc, the required drive power Fdem, or the like has the same meaning) as variables, any one region of a lockup off region, a slip operation region, and a lockup on region based on the actual vehicle speed V and throttle valve opening θth, and outputs the lockup command pressure Slu as a command signal to the hydraulic control circuit 54 such that the operation state of the lockup clutch 32 is brought into the operation state corresponding to the determined region. The linear solenoid valve SLU is driven (operated) provided in the hydraulic control circuit 54 according to the lockup command pressure Slu such that the operation state of the lockup clutch 32 is brought into the operation state corresponding to the determined region.

The lockup control under-execution determination unit 84a determines whether or not the lockup control is under execution in the lockup clutch control unit 84, that is, whether or not the operation state of the lockup clutch 32 is the lockup state (lockup on) or the lockup slip state (slip state) in the lockup clutch control unit 84. For example, the lockup control under-execution determination unit 84a determines that the lockup control is under execution when the actual vehicle speed V and throttle valve opening θth are in the lockup on region or the slip operation region in the lockup region diagram, and determines that the lockup control is not under execution when the actual vehicle speed V and throttle valve opening θth are in the lockup off region.

The lockup end control start condition establishment determination unit 84b determines whether or not conditions for ending the lockup control are established, that is, conditions for starting execution of lockup end control for ending the lockup control are established when the lockup control under-execution determination unit 84a determines that the lockup control is under execution. For example, the lockup end control start condition establishment determination unit 84b determines that the conditions for starting the execution of the lockup end control are established if the actual vehicle speed V and throttle valve opening θth move from the lockup on region or the slip operation region to the lockup off region in the lockup region diagram. The lockup end control start condition establishment determination unit 84b determines that the conditions for starting the execution of the lockup end control are established, if a gear shift is determined in the gear shift control unit 82, for example, that an up-shift or a down-shift is possible beyond an up-shift line or a down-shift line of the gear shift diagram. The lockup end control start condition establishment determination unit 84b determines that the conditions for starting the execution of the lockup end control are established, for example, in a case where there is a lockup control inhibition request according to protection of the friction members (first friction plates 38 and second friction plates 44) of the lockup clutch 32, a case where determination of sudden stopping, such as sudden braking, is made, or the like.

The lockup end control execution unit 84c has a constant standby pressure setting unit 84d, a sweeping rate setting unit 84e, a sweep end hydraulic pressure setting unit 84f, an end control end determination unit 84g, and the like. If the lockup end control start condition establishment determination unit 84b determines that the conditions for starting the execution of the lockup end control are established, the lockup end control execution unit 84c sets a value A of the lockup command pressure Slu, a sweeping rate $R_{SW}$, a value B of the lockup command pressure Slu, and the like respectively according to the state of the vehicle 10 when the conditions for starting the execution of the lockup end control are established in the lockup end control start condition establishment determination unit 84b, and starts the lockup end control (lockup clutch release control). The value A of the lockup command pressure Slu is a value at which the lockup engagement pressure $P_{SLU}$ becomes constant standby pressure (end control initial hydraulic pressure) $P_A$. The value B of the lockup command pressure Slu is a value at which the lockup engagement pressure $P_{SLU}$ becomes sweep end hydraulic pressure (end control end hydraulic pressure) $P_B$. Then, the lockup end control is control for sequentially decreasing the lockup command pressure Slu of the lockup engagement pressure $P_{SLU}$ to release the lockup clutch 32.

Figure 6:
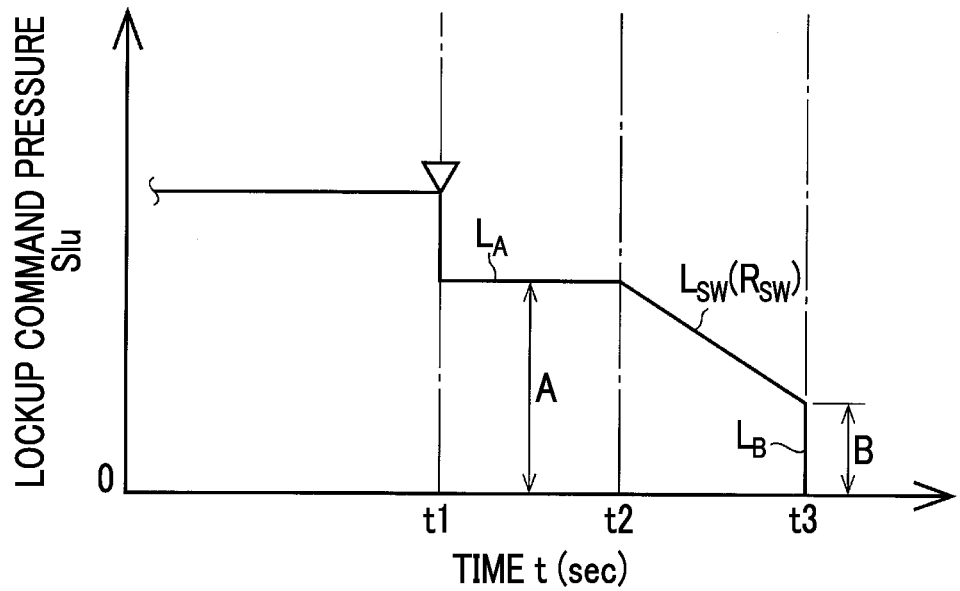
FIG. 6 is a diagram illustrating lockup end control which is executed by a lockup end control execution unit provided in an electronic control unit shown in FIG. 1.

In the lockup end control execution unit 84c, if the execution of the lockup end control is started, control is executed in an order of constant standby control, sweep control, and end control. For example, as shown in FIG. 6, in the constant standby control, if the lockup end control start condition establishment determination unit 84b determines that the conditions for starting the execution of the lockup end control are established (time t1 of FIG. 6), the lockup command pressure Slu of the lockup engagement pressure $P_{SLU}$ is made stand boy at the value A, at which the lockup engagement pressure $P_{SLU}$ becomes the constant standby pressure $P_A$, for a predetermined time (t2−t1). In the sweep control, the lockup command pressure Slu of the lockup engagement pressure $P_{SLU}$ is decreased at a constant sweeping rate $R_{SW}$ until the value B at which the lockup engagement pressure $P_{SLU}$ becomes the sweep end hydraulic pressure $P_B$ is reached from the value A at which the lockup engagement pressure $P_{SLU}$ becomes the constant standby pressure $P_A$. The sweeping rate $R_{SW}$ is indicated the amount of decrease of the lockup engagement pressure $P_{SLU}$ per elapsed time t (sec) after the sweep control is started, that is, the amount of decrease of the lockup command pressure Slu. In the end control, if the lockup command pressure Slu of the lockup engagement pressure $P_{SLU}$ becomes the value B at which the lockup engagement pressure $P_{SLU}$ becomes the sweep end hydraulic pressure $P_B$, the lockup end control is ended by setting the lockup command pressure Slu of the lockup engagement pressure $P_{SLU}$ to zero. The time t1 of FIG. 6 indicates the time when the lockup end control start condition establishment determination unit 84b determines that the conditions for starting the execution of the lockup end control are established and the execution of the constant standby control is started. The time t2 of FIG. 6 indicates the time when the constant standby control ends and the execution of the sweep control is started. The time t3 of FIG. 6 indicates the time when the sweep control ends and the execution of the end control is started. In FIG. 6, a solid line where the time t1 and the time t2 of FIG. 6 where the constant standby control is executed is indicated by a straight line $L_A$. A solid line between the time t2 and the time t3 of FIG. 6 where the sweep control is executed is indicated by a straight line $L_{SW}$. A solid line at the time t3 of the FIG. 6 where the end control is executed is indicated by a straight line $L_B$.

If the lockup end control start condition establishment determination unit 84b determines that the conditions for starting the execution of the lockup end control are established in a case where there is the lockup control inhibition request according to protection of the friction members of the lockup clutch 32 or in a case where the determination of sudden stopping, such as sudden braking, is made, the lockup end control execution unit 84c rapidly decreases the lockup command pressure Slu of the lockup engagement pressure $P_{SLU}$ to, for example, zero to release the lockup clutch 32 fast.

If the lockup end control start condition establishment determination unit 84b determines that the conditions for starting the execution of the lockup end control are established, the constant standby pressure setting unit 84d sets the value A of the lockup command pressure Slu according to the state of the vehicle 10 when the lockup end control start condition establishment determination unit 84b determines that the conditions for starting the execution of the lockup end control are established. The value A of the lockup command pressure Slu is a value at which the lockup engagement pressure $P_{SLU}$ in the constant standby control executed by the lockup end control execution unit 84c becomes the constant standby pressure $P_A$. For example, in the constant standby pressure setting unit 84d, when the lockup end control start condition establishment determination unit 84b determines that the conditions for starting the execution of the lockup end control are established, in a case where the vehicle 10 is traveling in a state of accelerator ON where the accelerator pedal is depressed, the value A of the lockup command pressure Slu at which the lockup engagement pressure $P_{SLU}$ becomes the constant standby pressure $P_A$ is set to be higher than in a case where the vehicle 10 is traveling in a state of accelerator OFF where the accelerator pedal is not depressed. That is, in the constant standby pressure setting unit 84d, when the lockup end control start condition establishment determination unit 84b determines that the conditions for starting the execution of the lockup end control are established, the larger the required drive power Fdem in the engine output control unit 80, the higher the value A of the lockup command pressure Slu set by the constant standby pressure setting unit 84d. The required drive power Fdem is the difference between output torque output from the engine 12 and load torque (driven torque) from the drive wheels 14.

Figure 7:
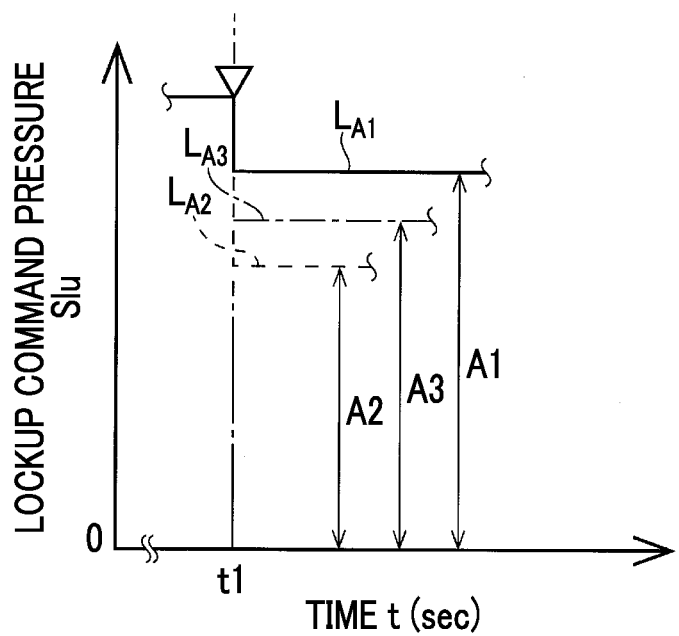
FIG. 7 is a diagram showing a part of FIG. 6, and is a diagram illustrating constant standby pressure which is set by a constant standby pressure setting unit provided in the electronic control unit shown in FIG. 1.

For example, in the constant standby pressure setting unit 84d, as shown in FIG. 7, when the lockup end control start condition establishment determination unit 84b determines that the conditions for starting the execution of the lockup end control are established, in a case where the state of the vehicle 10 is during traveling in a state of accelerator ON where the accelerator pedal is depressed, the value A of the lockup command pressure Slu at which the lockup engagement pressure $P_{SLU}$ becomes the constant standby pressure $P_A$ is set to a comparatively high value A1, and is controlled so as to follow a straight line $L_{A1}$ indicated by a solid line in constant standby pressure control. In a case where the state of the vehicle 10 is during traveling in a state of accelerator OFF where the accelerator pedal is not depressed, the value A of the lockup command pressure Slu at which the lockup engagement pressure $P_{SLU}$ becomes the constant standby pressure $P_A$ is set to a comparatively low value A2, and is controlled so as to follow a straight line $L_{A2}$ indicated by a broken line in the constant standby pressure control. In the constant standby pressure setting unit 84d, when the lockup end control start condition establishment determination unit 84b determines that the conditions for starting the execution of the lockup end control are established, in a case where the state of the vehicle 10 is during traveling in a state of accelerator ON where the accelerator pedal is depressed, the higher the required drive power Fdem in the engine output control unit 80, the higher the value A1 of the lockup command pressure Slu is set.

In the constant standby pressure setting unit 84d, when the lockup end control start condition establishment determination unit 84b determines that the conditions for starting the execution of the lockup end control are established, in a case where the state of the vehicle 10 is during traveling in a state of accelerator OFF where the accelerator pedal is not depressed, the value A of the lockup command pressure Slu is set to the value A2 or a value A3 shown in FIG. 7 based on remaining torque described below. For example, in the constant standby pressure setting unit 84d, as shown in FIG. 7, in a case where the remaining torque is comparatively small, the value A of the lockup command pressure Slu is set to the value A2. In a case where the remaining torque is comparatively large, the value A of the lockup command pressure Slu is set to the comparatively high value A3. Then, the value A of the lockup command pressure Slu is controlled so as to follow a straight line $L_{A3}$ indicated by a one-dot-chain line in the constant standby pressure control. The remaining torque is torque which is output when the operation of the engine 12 is continued with the amount of air still remaining in an intake pipe immediately after the engine output command value becomes zero along with accelerator OFF (a state where the electronic control throttle valve is fully closed).

Figure 8:
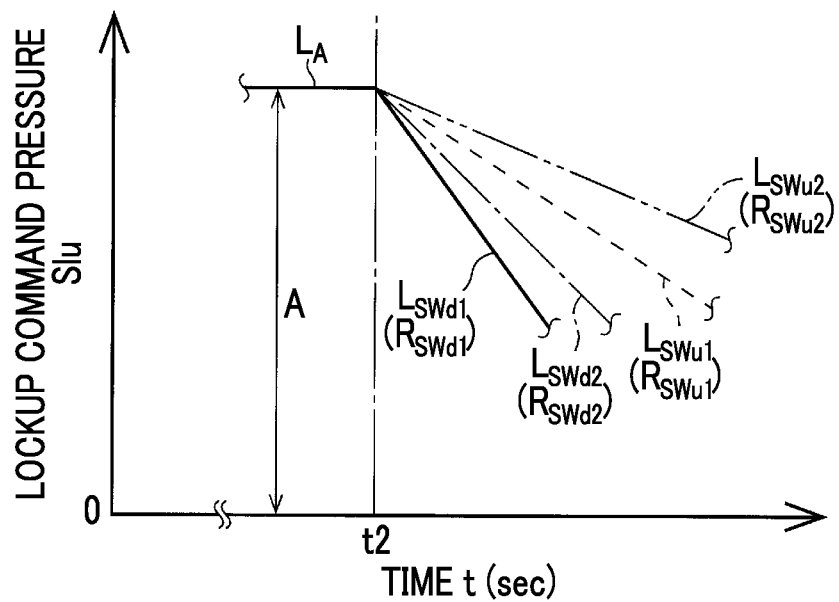
FIG. 8 is a diagram showing a part of FIG. 6, and is a diagram illustrating a sweeping rate which is set by a sweeping rate setting unit provided in the electronic control unit shown in FIG. 1.

If the lockup end control start condition establishment determination unit 84b determines that the conditions for starting the execution of the lockup end control are established, the sweeping rate setting unit 84e sets the sweeping rate $R_{SW}$ of the sweep control executed by the lockup end control execution unit 84c according to the state of the vehicle 10 when the lockup end control start condition establishment determination unit 84b determines that the conditions for starting the execution of the lockup end control are established. For example, in the sweeping rate setting unit 84e, when the lockup end control start condition establishment determination unit 84b determines that the conditions for starting the execution of the lockup end control are established, in a case where a gear shift is determined in the gear shift control unit 82, for example, that a down-shift is possible beyond the down-shift line of the gear shift diagram, that is, in a case where it is estimated that an increase rate of the engine rotation speed Ne becomes large, the sweeping rate $R_{SW}$ is set to be larger than in a case where a gear shift is determined in the gear shift control unit 82, for example, that an up-shift is possible beyond the up-shift line of the gear shift diagram, that is, in a case where it is not estimated that the increase rate of the engine rotation speed Ne becomes large. That is, in the sweeping rate setting unit 84e, as shown in FIG. 8, when the lockup end control start condition establishment determination unit 84b determines that the conditions for starting the execution of the lockup end control are established, in a case where a gear shift is determined that the down-shift is possible, the sweeping rate $R_{SW}$ is set to a comparatively large sweeping rate $R_{SWd1}$, and is controlled so as to follow a straight line $L_{SWd1}$ indicated by a solid line in the sweep control. In a case where a gear shift is determined that the up-shift is possible, the sweeping rate $R_{SW}$ is set to a comparatively low sweeping rate $R_{SWu1}$, and is controlled so as to follow a straight line $L_{SWu1}$ indicated by a broken line in the sweep control.

In the sweeping rate setting unit 84e, when the lockup end control start condition establishment determination unit 84b determines that the conditions for starting the execution of the lockup end control are established, in a case where a gear shift is determined that the down-shift is possible and the gear shift command pressure Sat for engaging and/or releasing the hydraulic frictional engagement devices involved in the gear shift of the automatic transmission 22 such that a predetermined forward gear stage corresponding to the determined gear shift is output as the command signal, the sweeping rate $R_{SW}$ is set to be smaller than in a case where a gear shift is only determined that the down-shift is possible. For example, in the sweeping rate setting unit 84e, as shown in FIG. 8, in a case where a gear shift is determined that the down-shift is possible and the gear shift command pressure Sat for engaging and/or releasing the hydraulic frictional engagement devices involved in the gear shift of the automatic transmission 22 such that the predetermined forward gear stage corresponding to the determined gear shift is obtained is output as the command signal, the sweeping rate $R_{SW}$ is set to a comparatively small sweeping rate $R_{SWd2}$, and is controlled so as to follow a straight line $L_{SWd2}$ indicated by a one-dot-chain line in the sweep control. In the sweeping rate setting unit 84e, when the lockup end control start condition establishment determination unit 84b determines that the conditions for starting the execution of the lockup end control are established, in a case where a gear shift is determined that the up-shift is possible and the gear shift command pressure Sat for engaging and/or releasing the hydraulic frictional engagement devices involved in the gear shift of the automatic transmission 22 such that a predetermined forward gear stage corresponding to the determined gear shift is obtained is output as the command signal, the sweeping rate $R_{SW}$ is set to be smaller than in a case where a gear shift is only determined that the up-shift is possible. For example, in the sweeping rate setting unit 84e, as shown in FIG. 8, in a case where a gear shift is determined that the up-shift is possible and the gear shift command pressure Sat for engaging and/or releasing the hydraulic frictional engagement devices involved in the gear shift of the automatic transmission 22 such that the predetermined forward gear stage corresponding to the determined gear shift is obtained is output as the command signal, the sweeping rate $R_{SW}$ is set to a comparatively small sweeping rate $R_{SWu2}$, and is controlled so as to become a straight line $L_{SWu2}$ indicated by a two-dot-chain line in the sweep control.

Figure 9:
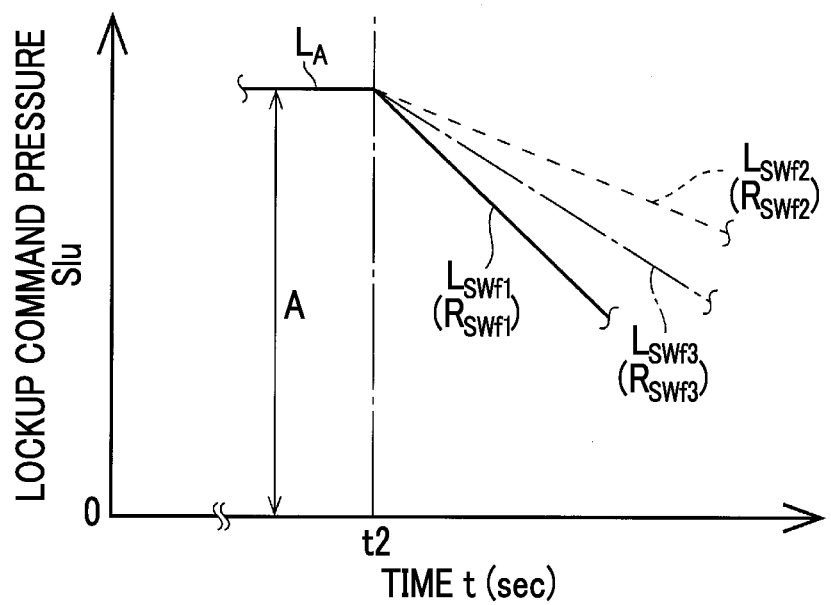
FIG. 9 is a diagram showing a part of FIG. 6, and is a diagram illustrating a sweeping rate which is set by the sweeping rate setting unit provided in the electronic control unit shown in FIG. 1.

When the lockup end control start condition establishment determination unit 84b determines that the conditions for starting the execution of the lockup end control are established, in a case where the engine output control command signal Se for stopping the supply of fuel from the fuel injection device is output to the fuel injection device in the fuel cut control unit 80a, the sweeping rate setting unit 84e sets the sweeping rate $R_{SW}$ to be greater than in a case where the engine output control command signal Se for allowing the supply of fuel from the fuel injection device is output to the fuel injection device in the fuel cut control unit 80a. For example, in the sweeping rate setting unit 84e, as shown in FIG. 9, in a case where the engine output control command signal Se for stopping the supply of fuel from the fuel injection device is output to the fuel injection device in the fuel cut control unit 80a, the sweeping rate $R_{SW}$ is set to a comparatively larger sweeping rate $R_{SWf1}$, and is controlled so as to follow a straight line $L_{SWf1}$ indicated by a solid line in the sweep control. In a case where the engine output control command signal Se for allowing the supply of fuel from the fuel injection device is output to the fuel injection device in the fuel cut control unit 80a, the sweeping rate $R_{SW}$ is set to a comparatively small sweeping rate $R_{SWf2}$, and is controlled so as to follow a straight line $L_{SWf2}$ indicated by a broken line in the sweep control.

In the sweeping rate setting unit 84e, when the lockup end control start condition establishment determination unit 84b determines that the conditions for starting the execution of the lockup end control are established, in a case where the engine output control command signal Se for stopping the supply of fuel from the fuel injection device is output to the fuel injection device in the fuel cut control unit 80a, and then, the engine output control command signal Se for stopping the supply of fuel from the fuel injection device is output to the fuel injection device in the fuel cut control unit 80a, the sweeping rate $R_{SW}$ is set to a comparatively small sweeping rate $R_{SWf3}$ from the sweeping rate $R_{SWf1}$, and is controlled so as to follow a straight line $L_{SWf3}$ indicated by a one-dot-chain line in the sweep control.

Figure 10:
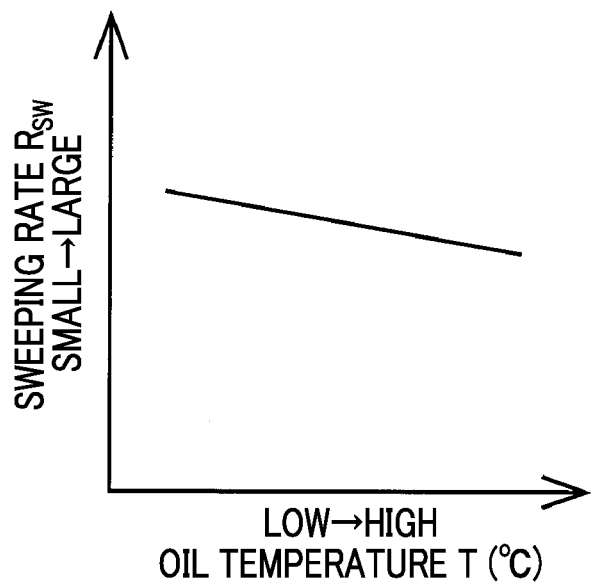
FIG. 10 is a diagram showing an example of a map for setting a sweeping rate from the oil temperature of hydraulic oil in the sweeping rate setting unit provided in the electronic control unit of FIG. 1.
Figure 11:
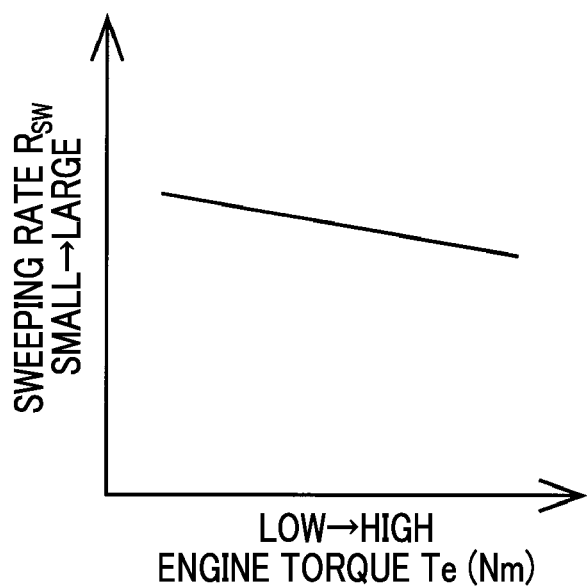
FIG. 11 is a diagram showing an example of a map for setting a sweeping rate from engine torque in the sweeping rate setting unit provided in the electronic control unit of FIG. 1.
Figure 12:
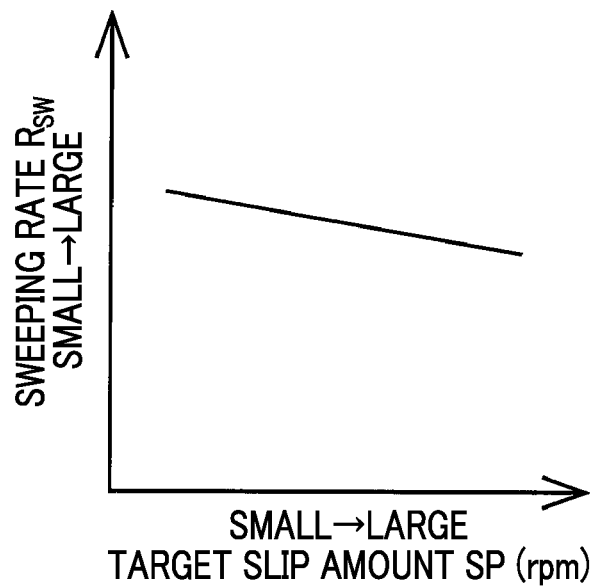
FIG. 12 is a diagram showing an example of a map for setting a sweeping rate from a target slip amount in the sweeping rate setting unit provided in the electronic control unit of FIG. 1.

If the lockup end control start condition establishment determination unit 84b determines that the conditions for starting the execution of the lockup end control are established, the sweeping rate setting unit 84e sets the sweeping rate $R_{SW}$, for example, according to a map shown in FIG. 10, 11, or 12 using the oil temperature T (° C.) of hydraulic oil, the engine torque Te (Nm), and a target slip amount SP (rpm) when the lockup end control start condition establishment determination unit 84b determines that the conditions for starting the execution of the lockup end control are established. The slip amount SP is the differential rotation between the engine rotation speed Ne (rpm) and the turbine rotation speed Nt (rpm). For example, in the sweeping rate setting unit 84e, the higher the oil temperature T (° C.) of hydraulic oil when the lockup end control start condition establishment determination unit 84b determines that the conditions for starting the execution of the lockup end control are established, as shown in the map of FIG. 10, the smaller the sweeping rate $R_{SW}$ is set. In the sweeping rate setting unit 84e, the higher the engine torque Te (Nm) when the lockup end control start condition establishment determination unit 84b determines that the conditions for starting the execution of the lockup end control are established, as shown in the map of FIG. 11, the smaller the sweeping rate $R_{SW}$ is set. In the sweeping rate setting unit 84e, the larger the target slip amount SP (rpm) when the lockup end control start condition establishment determination unit 84b determines that the conditions for starting the execution of the lockup end control are established, as shown in the map of FIG. 12, the smaller the sweeping rate $R_{SW}$ is set. In the sweeping rate setting unit 84e, in a case where the vehicle is accelerating when the lockup end control start condition establishment determination unit 84b determines the conditions for starting the execution of the lockup end control are established, the sweeping rates $R_{SWd2}$, $R_{SWu2}$ may be respectively set to larger sweeping rates based on the sweeping rates $R_{SWd1}$, $R_{SWu1}$. During a gear shift, since fluctuation of the engine rotation speed Ne is smaller than at the time of the start of the gear shift, shock can be suppressed even at a larger sweeping rate, and the lockup end control is completed in a shorter period.

If the lockup end control start condition establishment determination unit 84b determines that the conditions for starting the execution of the lockup end control are established, the sweep end hydraulic pressure setting unit 84f sets the value B of the lockup command pressure Slu, at which the lockup engagement pressure $P_{SLU}$ in the end control executed by the lockup end control execution unit 84c becomes the sweep end hydraulic pressure $P_B$, according to the state of the vehicle 10 when the lockup end control start condition establishment determination unit 84b determines that the conditions for starting the execution of the lockup end control are established. For example, in the sweep end hydraulic pressure setting unit 84f, when the lockup end control start condition establishment determination unit 84b determines that the conditions for starting the execution of the lockup end control are established, in a case where the lockup clutch 32 is in the flex lockup state which is the slip engagement state and the vehicle 10 is accelerating in a state of accelerator ON where the accelerator pedal is depressed, the value B of the lockup command pressure Slu at which the lockup engagement pressure $P_{SLU}$ becomes the sweep end hydraulic pressure $P_B$ is set to be higher than in a case where the lockup clutch 32 is in a flex lockup state which is a slip engagement state and the vehicle 10 is decelerating in a state of accelerator OFF where the accelerator pedal is not depressed. That is, in the sweep end hydraulic pressure setting unit 84f, when the lockup end control start condition establishment determination unit 84b determines that the conditions for starting the execution of the lockup end control are established, the larger the difference between the output torque output from the engine 12 and the load torque from the drive wheels 14, that is, the larger the required drive power Fdem in the engine output control unit 80, the higher the value B of the lockup command pressure Slu at which the lockup engagement pressure $P_{SLU}$ becomes the sweep end hydraulic pressure $P_B$ is set.

Figure 13:
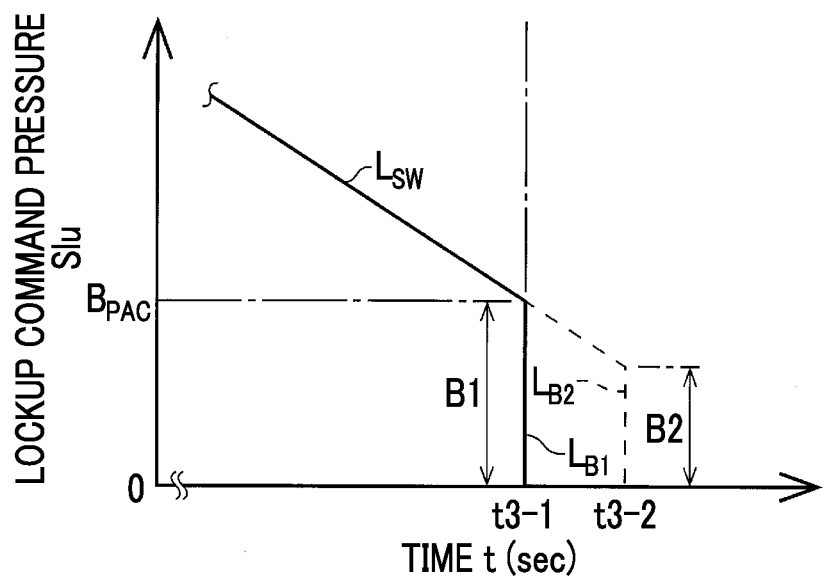
FIG. 13 is a diagram showing a part of FIG. 6, and is a diagram illustrating sweep end hydraulic pressure which is set by a sweep end hydraulic pressure setting unit provided in the electronic control unit shown in FIG. 1.

For example, in the sweep end hydraulic pressure setting unit 84f, as shown in FIG. 13, when the lockup end control start condition establishment determination unit 84b determines that the conditions for starting the execution of the lockup end control are established, in a case where the lockup clutch 32 is in the flex lockup state which is the slip engagement state and the vehicle 10 is accelerating in a state of accelerator ON where the accelerator pedal is depressed, the value B of the lockup command pressure Slu is set to a comparatively high value B1. Then, the value B of the lockup command pressure Slu is controlled so as to follow a straight line $L_{B1}$ indicated by a solid line in the end control. In a case where the lockup clutch 32 is in the flex lockup state which is the slip engagement state and the vehicle 10 is decelerating in a state of accelerator OFF where the accelerator pedal is not depressed, the value B of the lockup command pressure Slu is set to a comparatively low B2. Then, the value B of the lockup command pressure Slu is controlled so as to follow a straight line $L_{B2}$ indicated by a broken line in the end control. In this embodiment, the value B1 is equal to a value $B_{PAC}$ of the lockup command pressure Slu at which the lockup engagement pressure $P_{SLU}$ becomes pack end pressure (first hydraulic pressure) $P_{PAC}$ as hydraulic pressure required for packing the pack clearance of the lockup clutch 32. The value B2 may be set to a value less than the value $B_{PAC}$. It should be noted that the value B1 may be set to, for example, a value greater than the value $B_{PAC}$. The pack clearance is, for example, a clearance until the pressing member 48 provided in the lockup clutch 32 comes into contact with first friction plates 38 from a position returned by the return spring 52. The pack end pressure $P_{PAC}$ is represented by, for example, backpressure (average value $(P_{TCin}+P_{TCout})/2$ of torque converter-in pressure and torque converter-out pressure)+$P_{SP}$ generated by the control oil chamber 20d such that the pressing force of the hydraulic pressure pressing member 48 becomes the energizing force of the return spring 52+α. α is a value which changes according to the state of the vehicle.

After the lockup end control start condition establishment determination unit 84b determines that the conditions for starting the execution of the lockup end control are established. If the execution of the lockup end control is started by the lockup end control execution unit 84c, the end control end determination unit 84g determined whether or not the lockup end control ends. For example, the end control end determination unit 84g determines that the lockup end control ends if the lockup command pressure Slu becomes the value B set by the sweep end hydraulic pressure setting unit 84f.

Figure 14:
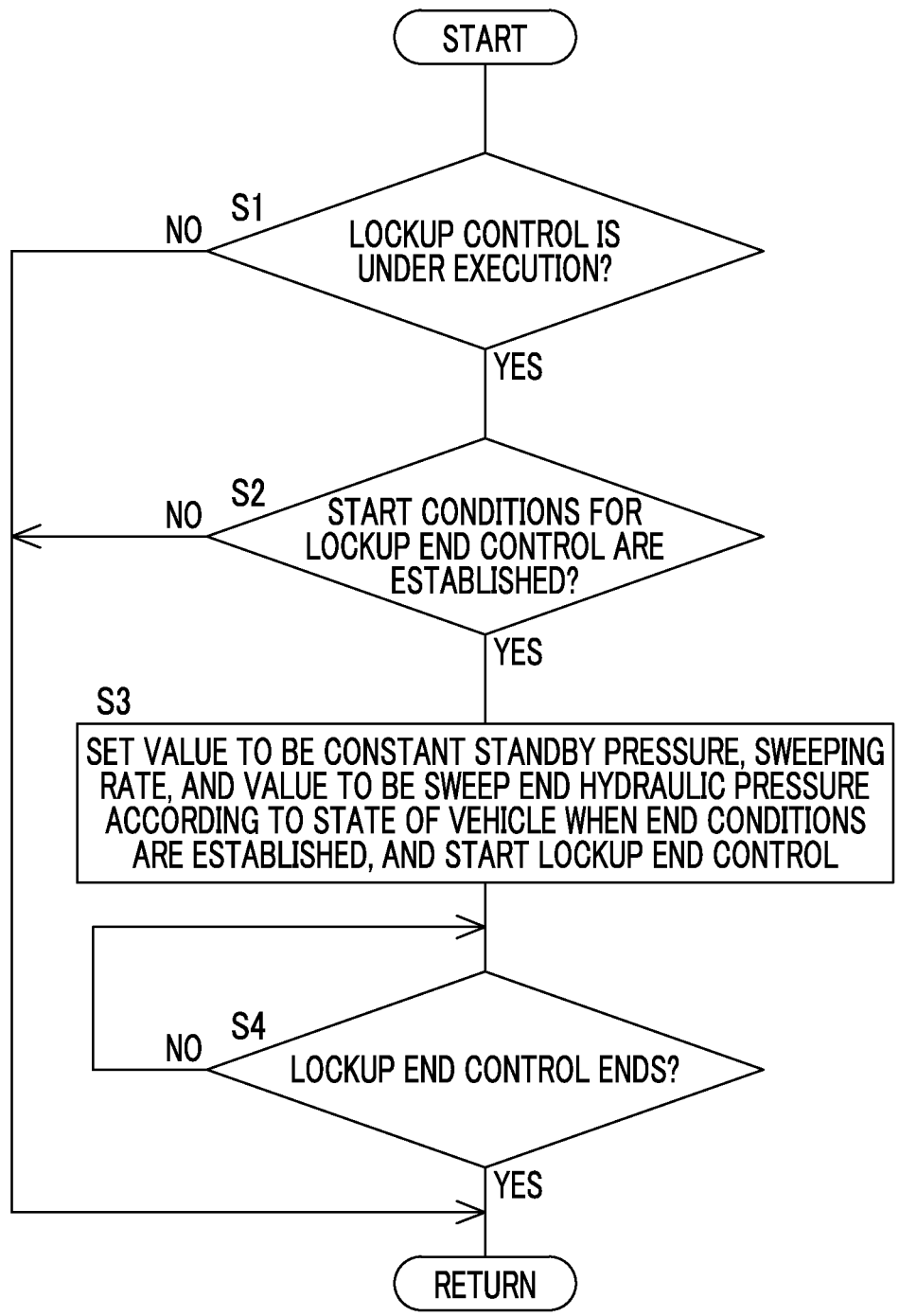
FIG. 14 is a flowchart illustrating an example of control operation of lockup end control in the electronic control unit of FIG. 1.

FIG. 14 is a flowchart showing a main part of control operation of the lockup end control (lockup clutch release control) in the electronic control unit 56.

First, in Step (hereinafter, Step will be omitted) S1 corresponding to the function of the lockup control under-execution determination unit 84a, it is determined whether or not the lockup control is under execution. In a case where the determination of S1 is negative, S1 is executed again, and in a case where the determination of S1 is affirmative, S2 corresponding to the function of the lockup end control start condition establishment determination unit 84b is executed.

In S2 described above, it is determined whether or not the conditions for ending the lockup control, that is, the conditions for starting the execution of the lockup end control are established. In a case where the determination of S2 is negative, S1 described above is executed, and in a case where the determination of S2 is affirmative, S3 corresponding to the functions of the constant standby pressure setting unit 84d, the sweeping rate setting unit 84e, the sweep end hydraulic pressure setting unit 84f, and the lockup end control execution unit 84c is executed. In S3 described above, the value A of the lockup command pressure Slu at which the lockup engagement pressure $P_{SLU}$ becomes the constant standby pressure $P_A$, the sweeping rate $R_{SW}$, and the value B of the lockup command pressure Slu at which the lockup engagement pressure $P_{SLU}$ becomes the sweep end hydraulic pressure $P_B$ are set according to the state of the vehicle 10 when the conditions for starting the execution of the lockup end control are established in S2 described above, and the lockup end control is started. Next, S4 corresponding to the function of the end control end determination unit 84g is executed. In a case where the determination of S4 is negative, S4 described above is executed again, and in a case where the determination of S4 is affirmative, S1 is executed.

According to the flowchart of FIG. 14, in S3 described above, when the conditions for starting the lockup end control are established, for example, in a case where the vehicle 10 is traveling in a state of accelerator ON where the accelerator pedal is depressed, the value A of the lockup command pressure Slu at which the lockup engagement pressure $P_{SLU}$ becomes the constant standby pressure $P_A$ is set to be higher (for example, the value A1) than in a case where the vehicle 10 is traveling in a state of accelerator OFF where the accelerator pedal is not depressed, and the execution of the lockup end control is started. For this reason, fast release of the lockup clutch 32 or racing of the engine rotation speed is suppressed during the lockup end control and shock during the lockup end control is suppressed. In S3 described above, when the conditions for starting the lockup end control are established, for example, in a case where the vehicle 10 is traveling in a state of accelerator OFF when the accelerator pedal is not depressed, the value A of the lockup command pressure Slu at which the lockup engagement pressure $P_{SLU}$ becomes the constant standby pressure $P_A$ is set to be low (for example, the value A2) than in a case where the vehicle 10 is traveling in a state of accelerator ON where the accelerator pedal is depressed, and the execution of the lockup end control is started. For this reason, if the value A of the lockup command pressure Slu is set to be low, the difference between the value A and the value B of the lockup command pressure Slu is comparatively small, the differential pressure between the constant standby pressure $P_A$ and the sweep end hydraulic pressure $P_B$ becomes comparatively small, and the hydraulic pressure output period during which hydraulic pressure is output to the lockup clutch 32 is set to be shortened, whereby it is possible to reduce the time of the lockup end control.

According to the flowchart of FIG. 14, in S3 described above, when the conditions for starting the lockup end control are established, for example, in a case where the lockup clutch 32 is in the flex lockup state which is the slip engagement state and the vehicle 10 is traveling in a state of accelerator ON where the accelerator pedal is depressed, the value A of the lockup command pressure Slu at which the lockup engagement pressure $P_{SLU}$ becomes the constant standby pressure $P_A$ is set to be higher (for example, the value A1) and the value B of the lockup command pressure Slu at which the lockup engagement pressure $P_{SLU}$ becomes the sweep end hydraulic pressure $P_B$ is set to be higher (for example, the value B1) than in a case where the lockup clutch 32 is in the flex lockup state which is the slip engagement state and the vehicle 10 is traveling in a state of accelerator OFF where the accelerator pedal is not depressed. Then, the execution of the lockup end control is started. In S3 described above, when the conditions for starting the lockup end control are established, for example, in a case where the lockup clutch 32 is in the flex lockup state which is the slip engagement state and the vehicle 10 is traveling in a state of accelerator OFF where the accelerator pedal is not depressed, the value A of the lockup command pressure Slu at which the lockup engagement pressure $P_{SLU}$ becomes the constant standby pressure $P_A$ is set to be lower (for example, the value A2) and the value B of the lockup command pressure Slu at which the lockup engagement pressure $P_{SLU}$ becomes the sweep end hydraulic pressure $P_B$ is set to be lower (for example, the value B2) than in a case where the lockup clutch 32 is in the flex lockup state which is the slip engagement state and the vehicle 10 is traveling in a state of accelerator ON where the accelerator pedal is depressed. Then, the execution of the lockup end control is started.

As described above, according to the electronic control unit 56 of the power transmission system 16 of this embodiment, in a case where it is determined that the execution of the lockup end control is started, the larger the difference between the output torque output from the engine 12 and the load torque from the drive wheels 14 when it is determined that the execution of the lockup end control is started, the higher the value A of the lockup command pressure Slu at which the lockup engagement pressure $P_{SLU}$ becomes the constant standby pressure $P_A$ in the lockup end control is set. For this reason, if the difference between the output torque output from the engine 12 and the load torque from the drive wheels 14 when it is determined that the execution of the lockup end control is started is large and the torque input to the lockup clutch 32 is large, the value A of the lockup command pressure Slu at which the lockup engagement pressure $P_{SLU}$ becomes the constant standby pressure $P_A$ in the lockup end control is set to be high; thus, fast release of the lockup clutch 32 or racing of the engine rotation speed during the lockup end control is suppressed, and shock during the lockup end control is suppressed. If the difference between the output torque output from the engine 12 and the load torque from the drive wheels 14 when it is determined that the execution of the lockup end control is started is small, and the torque input to the lockup clutch 32 is small, the value A of the lockup command pressure Slu at which the lockup engagement pressure $P_{SLU}$ becomes the constant standby pressure $P_A$ in the lockup end control is set to be low, and the hydraulic pressure output period output to the lockup clutch 32 is set to be shortened. Therefore, it is possible to reduce the time of the lockup end control.

According to the electronic control unit 56 of the power transmission system 16 of this embodiment, in a case where it is determined that the execution of the lockup end control is started, the larger the difference between the output torque output from the engine 12 and the load torque from the drive wheels 14 when the lockup clutch 32 is in the flex lockup state which is the slip engagement state and it is determined that the execution of the lockup end control is started, the higher the value A of the lockup command pressure Slu at which the lockup engagement pressure $P_{SLU}$ becomes the constant standby pressure $P_A$ in the lockup end control and the value B of the lockup command pressure Slu at which the lockup engagement pressure $P_{SLU}$ becomes the sweep end hydraulic pressure $P_B$ are set. For this reason, fast release of the lockup clutch 32 or racing of the engine rotation speed during the lockup end control is suppressed and shock during the lockup end control is suppressed. Furthermore, since the hydraulic pressure output period during which hydraulic pressure is output to the lockup clutch 32 is set to be suitably shortened, it is possible to reduce the time of the lockup end control.

According to the electronic control unit 56 of the power transmission system 16 of this embodiment, when the execution of the lockup end control is started, in a case where the vehicle 10 is accelerating and the lockup clutch 32 is in the flex lockup state which is the slip engagement state, the value B of the lockup command pressure Slu is set to the value B1 at which the sweep end hydraulic pressure $P_B$ becomes the pack end pressure $P_{PAC}$ required for packing the pack clearance of the lockup clutch 32, and when the execution of the lockup end control is started, in a case where the vehicle 10 is decelerating and the lockup clutch 32 is in the flex lockup state, the value B of the lockup command pressure Slu is set to the value B2 less than the pack end pressure $P_{PAC}$. Therefore, shock when the lockup clutch 32 is released from an acceleration flex lockup state where the vehicle 10 is accelerating and the lockup clutch 32 is in the slip engagement state or a deceleration flex lockup state where the vehicle 10 is decelerating and the lockup clutch 32 is in the slip engagement state is suppressed.

According to the electronic control unit 56 of the power transmission system 16 of this embodiment, when the execution of the lockup end control is started, in a case where it is estimated that the increase rate of the engine rotation speed becomes large, the sweeping rate $R_{SW}$ until the value B of the lockup command pressure Slu at which the lockup engagement pressure $P_{SLU}$ becomes the sweep end hydraulic pressure $P_B$ is reached from the value A of the lockup command pressure Slu at which the lockup engagement pressure $P_{SLU}$ becomes the constant standby pressure $P_A$ is set to be higher than in a case where it is not estimated that the increase rate of the engine rotation speed becomes large. For this reason, in a case where it is not estimated that the increase rate of the engine rotation speed becomes large, the sweeping rate $R_{SW}$ becomes comparatively small. Therefore, the slip period of the lockup clutch 32 during the lockup end control is extended, and a shock suppression effect during the lockup end control becomes high.

According to the electronic control unit 56 of the power transmission system 16 of this embodiment, the lockup end control has the constant standby control, the sweep control, and the end control. In the constant standby control, the lockup command pressure Slu is made stand by at the value A for a predetermined time in order to make the lockup engagement pressure $P_{SLU}$ stand by at the constant standby pressure $P_A$ for a predetermined time. In the sweep control, the lockup command pressure Slu of the lockup engagement pressure $P_{SLU}$ until the value B of the lockup command pressure Slu at which the lockup engagement pressure $P_{SLU}$ becomes the sweep end hydraulic pressure $P_B$ is reached from the value A of the lockup command pressure Slu at which the lockup engagement pressure $P_{SLU}$ becomes the constant standby pressure $P_A$ is decreased at the sweeping rate $R_{SW}$. In the end control, if the lockup command pressure Slu of the lockup engagement pressure $P_{SLU}$ becomes the value B at which the lockup engagement pressure $P_{SLU}$ becomes the sweep end hydraulic pressure $P_B$, the lockup end control is ended by setting the lockup command pressure Slu of the lockup engagement pressure $P_{SLU}$ to zero. In the lockup end control, control is executed in an order of the constant standby control, the sweep control, and the end control. For this reason, the lockup command pressure Slu of the lockup engagement pressure $P_{SLU}$ is decreased by the lockup end control in order to release the lockup clutch 32.

Next, a second embodiment of the present disclosure will be described. The portions common to the first embodiment described above are represented by the same reference numerals, and description thereof will not be repeated.

Figure 15:
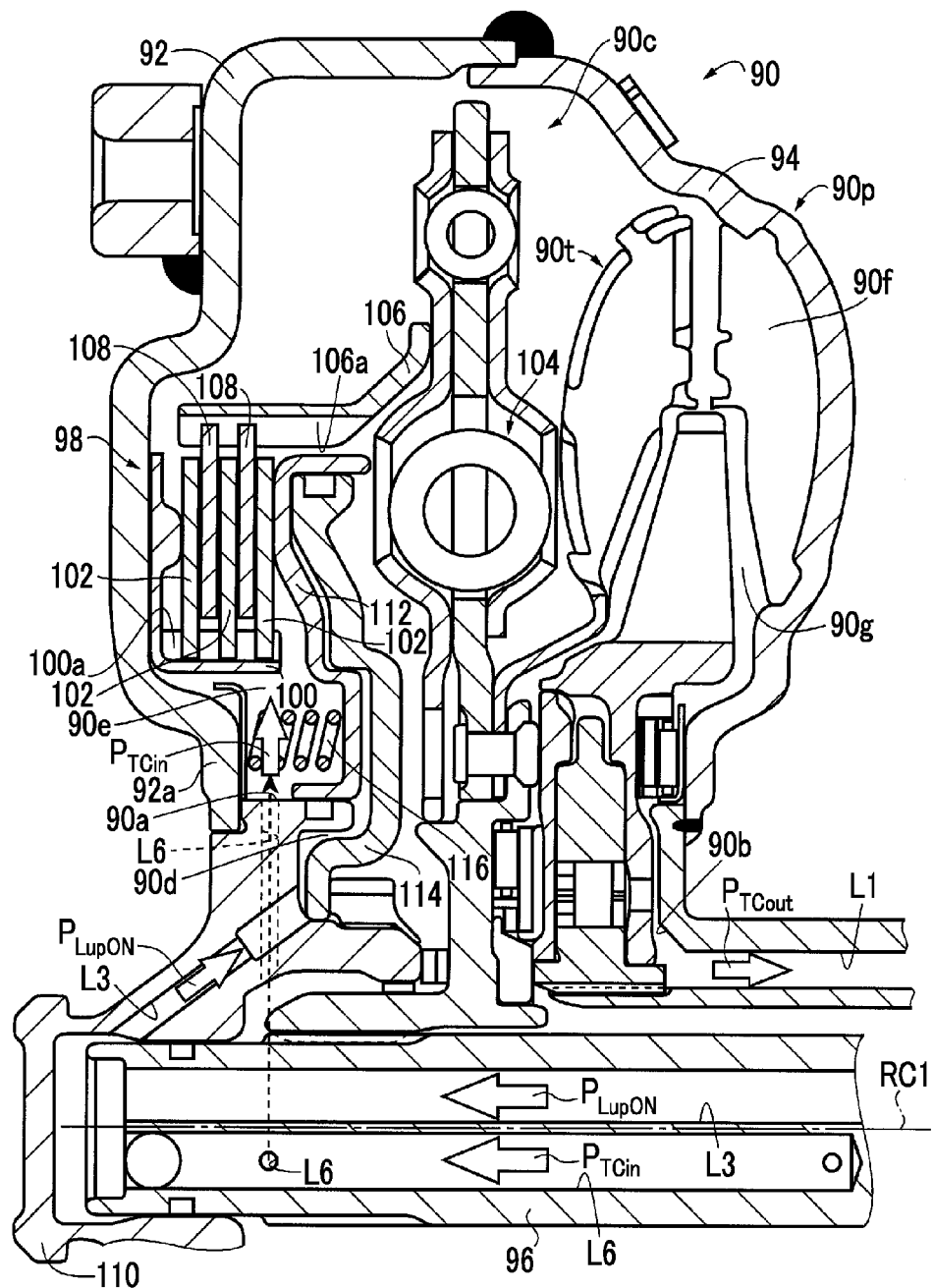
FIG. 15 is a sectional view illustrating a torque converter of a power transmission system for a vehicle of a second embodiment of the present disclosure.

FIG. 15 is a diagram illustrating a power transmission system (a power transmission system for a vehicle) according to a second embodiment of the present disclosure. The power transmission system of the second embodiment is different from the power transmission system 16 of the first embodiment in that the shape of a torque converter 90 is different from the shape of the torque converter 20, and others are nearly the same as those of the power transmission system 16 of the first embodiment.

The torque converter 90 is coupled to the crank shaft 12a of the engine 12 such that power transmission is possible. The torque converter 90 is provided with a front cover 92 and a rear cover 94, a plurality of pump blades 90f, a pump impeller (input member) 90p, and a turbine impeller (output member) 90t. The front cover 92 and the rear cover 94 are welded to each other. A plurality of pump blades 90f are fixed inside the rear cover 94. The pump impeller 90p is provided to rotate around the axis RC. The turbine impeller 90t faces the rear cover 94 and is coupled to a transmission input shaft 96 such that power transmission is possible. The torque converter 90 is provided with a lockup clutch 98 in a control oil chamber 90d described below. The lockup clutch 98 directly connects the pump impeller 90p and the turbine impeller 90t with supply of the lockup engagement pressure $P_{SLU}$. In this way, the torque converter 90 functions as a coupling using a fluid for a vehicle with the lockup clutch 98 provided in the power transmission path between the engine 12 and the automatic transmission 22.

The lockup clutch 98 is a hydraulic multiple disc friction clutch. As shown in FIG. 15, the lockup clutch 98 is provided with a first annular member 100, a plurality (in this embodiment, three) of annular first friction plates (friction plates) 102, a second annular member 106, a plurality (in this embodiment, two) of annular second friction plates (friction plates) 108, an annular pressing member (piston) 112, an annular fixed member 114, and a return spring 116. The first annular member 100 is fixed to the front cover 92 integrally coupled to the pump impeller 90p through welding. The first friction plates 102 are engaged with outer circumferential spline teeth 100a formed on the outer circumference of the first annular member 100 to be relatively unrotatable around the axis RC and movable in the direction of the axis RC. The second annular member 106 is coupled to the transmission input shaft 96 and the turbine impeller 90t through a damper device 104 provided in the torque converter 90 such that power transmission is possible. The second friction plates 108 are engaged with inner circumferential spline teeth 106a formed on the inner circumference of the second annular member 106 to be relatively unrotatable around the axis RC and movable in the direction of the axis RC and are provided between a plurality of first friction plates 102. The pressing member 112 is supported by a hub member 110, which is fixed to an inner circumferential portion 92a of the front cover 92 and supports an end portion of the transmission input shaft 96 on the front cover 92 side to be rotatable around the axis RC, to be movable in the direction of the axis RC, and faces the front cover 92. The fixed member 114 is supported in a state of being positioned and fixed to the hub member 110, and is provided to face the pressing member 112 on a side of the pressing member 112 opposite to the front cover 92 side. The return spring 116 energizes the pressing member 112 toward the fixed member 114 in the direction of the axis RC, that is, energizes the pressing member 112 in a direction of being separated from the first friction plates 102 and the second friction plates 108 in the direction of the axis RC.

As shown in FIG. 15, the torque converter 90 is provided in the front cover 92 and the rear cover 94. Then, a main oil chamber (torque converter oil chamber) 90c having a hydraulic oil supply port 90a to which hydraulic oil output from the oil pump 33 is supplied and a hydraulic oil outlet port 90b from which hydraulic oil supplied from the hydraulic oil supply port 90a flows out is formed. In the main oil chamber 90c of the torque converter 90, the lockup clutch 98, a control oil chamber 90d, a front oil chamber 90e, and a rear oil chamber 90g are provided. To the control oil chamber 90d, lockup engagement pressure $P_{SLU}$ for engaging the lockup clutch 98, that is, for energizing the pressing member 112 pressing the first friction plates 102 and the second friction plates 108 of the lockup clutch 98 toward the front cover 92 side is supplied. To the front oil chamber 90e, for example, second hydraulic line pressure Psec described below for releasing the lockup clutch 98, that is, for energizing the pressing member 112 toward a side opposite to the front cover 92 side is supplied. The rear oil chamber 90g communicates with the front oil chamber 90e, is filled with hydraulic oil from the front oil chamber 90e, and allows hydraulic oil to flow out from the hydraulic oil outlet port 90b.

In the torque converter 90, for example, if lockup-on pressure $P_{LupON}$ (kPa) of the control oil chamber 90d is comparatively large (torque converter-in pressure $P_{TCin}$ (kPa) of the front oil chamber 90e is comparatively small) and the pressing member 112 is moved toward the front cover 92 side in the direction of the axis RC1, the first friction plates 102 clamp the second friction plates 108 with the pressing member 112 and the pump impeller 90p coupled to the first annular member 100 and the turbine impeller 90t coupled to the second annular member 106 rotate integrally. For example, if the lockup-on pressure $P_{LupON}$ (kPa) of the control oil chamber 90d is comparatively small (the torque converter-in pressure $P_{TCin}$ (kPa) of the front oil chamber 90e is comparatively large) and the pressing member 112 is moved toward a side opposite to the front cover 92 side in the direction of the axis RC1, the pump impeller 90p coupled to the first annular member 100 and the turbine impeller 90t coupled to the second annular member 106 rotate relatively.

The lockup clutch 98 is a hydraulic multiple disc friction clutch in which a plurality of first friction plates 102 and a plurality of second friction plates 108 are frictionally engaged by controlling the lockup-on pressure $P_{LupON}$ (kPa) of the control oil chamber 90d and the lockup differential pressure with the hydraulic control circuit 54 described above. The lockup differential pressure $\Delta P$ is differential pressure $\Delta P$ ($=P_{LupON}-(P_{TCin}+P_{TCout})/2$) from the average value ($(P_{TCin}+P_{TCout})/2$) of the torque converter-in pressure $P_{TCin}$ (kPa) of the front oil chamber 90e and the torque converter-out pressure $P_{TCout}$ (kPa) discharged from the rear oil chamber 90g. The lockup differential pressure $\Delta P$ is controlled by the electronic control unit 56 through the hydraulic control circuit 54, whereby the lockup clutch 98 is switched to any one operation state of, for example, a lockup release state (lockup off), a lockup slip state (slip state), and a lockup state (lockup on). The lockup release state is a state where the lockup differential pressure $\Delta P$ becomes negative and the lockup clutch 98 is released. The lockup slip state is a state where the lockup differential pressure $\Delta P$ becomes equal to or greater than zero and the lockup clutch 98 is half-engaged according to a slip. The lockup state is a state where the lockup differential pressure ΔP becomes a maximum value and the lockup clutch 98 is completely engaged.

The embodiments of the present disclosure have been described above in detail referring to the drawings, the present disclosure is also applied in other aspects.

For example, the torque converters 20, 90 of the foregoing embodiments respectively have the hydraulic oil supply ports 20a, 90a, the hydraulic oil outlet ports 20b, 90b, and ports from which the lockup engagement pressure $P_{SLU}$ is supplied to the control oil chambers 20d, 90d. Then, the pressing members 48, 112 move at the time of the engagement of the lockup clutch, the hydraulic oil between the pressing members 48, 112 and the front covers 34, 92 is compressed and the backpressure (($P_{TCin}+P_{TCout}$)/2) increases. However, the power transmission system for a vehicle according to each embodiment of the present disclosure can be applied to other torque converters, for example, a torque converter in which the backpressure (($P_{TCin}+P_{TCout}$)/2) is not applied.

In the foregoing embodiments, although the constant standby pressure control, the sweep control, and the sweep end control in the lockup end control are executed in this order, the constant standby pressure control, the sweep control, the sweep end control are not necessarily executed. That is, in the lockup end control, any control may be performed as long as the lockup command pressure Slu of the lockup engagement pressure $P_{SLU}$ is decreased in order to release the lockup clutch 32. In the lockup end control for decreasing the lockup command pressure Slu of the lockup engagement pressure $P_{SLU}$ in order to release the lockup clutch 32 described above, the larger the difference between the output torque output from the engine 12 and the load torque from the drive wheels 14 when it is determined that the execution of the lockup end control is started, the higher the lockup command pressure Slu of the end control initial hydraulic pressure of the lockup end control is set, whereby an effect to suppress the occurrence of shock during the lockup end control and to reduce the time of the lockup end control compared to the related art is obtained.

In the sweep end hydraulic pressure setting unit 84f of the foregoing embodiments, while the vehicle 10 is accelerating in a state of accelerator ON where the accelerator pedal is depressed, in a case where the lockup clutch 32 is in the flex lockup state which is the slip engagement state, the value B of the lockup command pressure Slu is set to the value B1 of the lockup command pressure Slu to be the pack end pressure $P_{PAC}$ or larger. However, for example, even in a case where the lockup clutch 32 is in a complete engagement state, the value B of the lockup command pressure Slu may be set to the above-described value B1 or larger. In addition, in the sweep end hydraulic pressure setting unit 84f of the foregoing embodiments, while the vehicle 10 is decelerating in a state of accelerator OFF where the accelerator pedal is not depressed, in a case where the lockup clutch 32 is in the flex lockup state which is the slip engagement state, the value B of the lockup command pressure Slu is set to the comparatively low value B2. However, for example, even in a case where the lockup clutch 32 is in the complete engagement state, the value B of the lockup command pressure Slu may be set to the comparatively low value B2.

In the above-described embodiments, although the torque converter 20 or 90 is used in the vehicle 10, a fluid coupling or the like having no torque amplification effect may be used in place of the torque converter 20 or 90 having a torque amplification effect.

The above description is merely an embodiment, and the present disclosure can be implemented in variously modified and improved forms based on the knowledge of those skilled in the art.

What is claimed is:

1. A power transmission system for a vehicle, the power transmission system comprising:
    a transmission;
    a torque converter provided between the transmission and a power source;
    a lockup clutch configured to directly connect an input member and an output member of the torque converter with supply of control hydraulic pressure to a control oil chamber; and
    an electronic control unit configured to:
        (i) execute lockup end control that decreases the control hydraulic pressure to release the lockup clutch, and
        (ii) make end control initial hydraulic pressure of the lockup end control higher as a difference between output torque and driven torque is larger, when the electronic control unit determines that the execution of the lockup end control starts, the output torque being output from the power source when the electronic control unit determines that the execution of the lockup end control starts, the driven torque being supplied from drive wheels.

2. The power transmission system according to claim 1, wherein
    the electronic control unit is configured to make end control end hydraulic pressure of the lockup end control higher as the difference between output torque and driven torque is larger, when the electronic control unit determines that the execution of the lockup end control starts.

3. The power transmission system for a vehicle according to claim 2, wherein
    the electronic control unit is configured to:
        (i) make the end control end hydraulic pressure equal to or greater than first hydraulic pressure required for packing a pack clearance of the lockup clutch, when the vehicle is accelerating when the execution of the lockup end control starts, and
        (ii) make the end control end hydraulic pressure have a value less than the first hydraulic pressure, when the vehicle is accelerating when the execution of the lockup end control starts.

4. The power transmission system according to claim 2, wherein
    the electronic control unit is configured to make a sweeping rate when the electronic control unit estimates that an increase rate of an engine rotation speed larger than the sweeping rate when the electronic control unit does not estimate that an increase rate of a rotation speed of the power source becomes large, the sweeping rate being values until the end control end hydraulic pressure is reached from the end control initial hydraulic pressure, when the execution of the lockup end control starts.

5. The power transmission system according to claim 2, wherein
    the lockup end control has constant standby control, end control, and sweep control, and the electronic control unit is configured to:
        (i) make the control hydraulic pressure stand by at the end control initial hydraulic pressure for a predetermined time, in the constant standby control, (ii) decrease, at a sweeping rate, the control hydraulic pressure until the end control end hydraulic pressure is reached from the end control initial hydraulic pressure, in the sweep control,
(iii) end the lockup end control by setting the control hydraulic pressure to zero when the control hydraulic pressure becomes the end control end hydraulic pressure, in the end control, and
(iv) execute control in an order of the constant standby control, the sweep control, and the end control, in the lockup end control.

* * * * *